(12) United States Patent
Yu et al.

(10) Patent No.: US 12,462,311 B2
(45) Date of Patent: Nov. 4, 2025

(54) SYSTEMS AND METHODS FOR AUTOMATICALLY RECOMMENDING ACCOUNT CODES

(71) Applicant: COUPA SOFTWARE INCORPORATED, San Mateo, CA (US)

(72) Inventors: Hongyang Yu, Sydney (AU); Sandip Mandlecha, Pune (IN); Tim Durkin, Daly City, CA (US); Neha Arora, San Mateo, CA (US); Rebecca Mengell, Dublin, CA (US); Shashank Dass, Castro Valley, CA (US); Keeyoung Kim, Seoul (KR)

(73) Assignee: Coupa Software Incorporated, Foster City, CA (US)

( * ) Notice: Subject to any disclaimer, the term of this patent is extended or adjusted under 35 U.S.C. 154(b) by 364 days.

(21) Appl. No.: 18/070,930

(22) Filed: Nov. 29, 2022

(65) Prior Publication Data

US 2024/0177244 A1 May 30, 2024

(51) Int. Cl.
 *G06Q 40/12* (2023.01)
(52) U.S. Cl.
 CPC .................. *G06Q 40/12* (2013.12)
(58) Field of Classification Search
 None
 See application file for complete search history.

(56) References Cited

U.S. PATENT DOCUMENTS 8,032,454 B2 * 10/2011 Felton ............... G06Q 40/12
 705/28
8,781,882 B1 * 7/2014 Arboletti ............ G06Q 10/0639
 705/7.41

(Continued)

OTHER PUBLICATIONS

D. Chong, "Deep Dive into Netflix's Recommender System," Towards Data Science, a Medium publication, https://towardsdatascience.com/deep-dive-into-netflixs-recommender-system-341806ae3b48, Apr. 30, 2020, 16 pages.

(Continued)

*Primary Examiner* — Fateh M Obaid
(74) *Attorney, Agent, or Firm* — Baker Botts L.L.P.

(57) ABSTRACT

A computer implemented method comprising receiving invoice data comprising at least one of invoice descriptions and invoice characters from user computers, each of the invoice descriptions and invoice characters defines contexts and patterns, wherein each of the invoice data comprising a supplier-customer information that corresponds to a supplier-customer transaction; analyzing the at least one of the invoice descriptions and the invoice characters with corresponding contexts and patterns; determining that amount of the invoice characters is more than a threshold number of characters, for performing: matching invoice data, invoice characters with predefined historical invoice data that corresponds to the same supplier-customer information; computing a similarity score for each of the invoice data; and displaying recommendations including first account codes to (Continued)

map the one or more first account codes to each of the one or more invoice data based on the similarity score; determining that amount of the invoice characters is not more than the threshold number of characters, for performing: filtering the invoice descriptions of the invoice data based on predetermined constraints to extract filtered invoice data comprising filtered description lines; identifying categories associated with each of the filtered description lines of the filtered invoice data; matching each of the identified categories, including corresponding contexts and patterns that is associated with a supplier-customer information with one or more predefined historical categories associated with predefined invoice description of the one or more predefined historical invoice data that corresponds to the same supplier-customer information, wherein each of the contexts and the patterns are matched with predefined contexts and patterns of the predefined historical invoice data that corresponds to the same supplier-customer information; computing a categorical similarity score for each of the categories associated with the supplier-customer information; and displaying on the graphical user interface, second recommendations including second account codes based on the computed categorical similarity score of each of the categories to map the second account codes to the invoice data.

18 Claims, 12 Drawing Sheets

(56) References Cited

U.S. PATENT DOCUMENTS

| | | | | |
|---|---|---|---|---|
| 10,395,287 | B1* | 8/2019 | Lowell | G06Q 10/06316 |
| 10,937,075 | B1* | 3/2021 | Harris | G06Q 99/00 |
| 11,049,191 | B1* | 6/2021 | Wilczek | G06Q 40/123 |
| 11,288,720 | B1* | 3/2022 | Vasudevan | G06Q 20/14 |
| 2006/0095372 | A1* | 5/2006 | Venkatasubramanian | G06Q 20/102 705/40 |
| 2008/0015982 | A1* | 1/2008 | Sokolic | G06Q 20/10 705/39 |
| 2013/0226738 | A1* | 8/2013 | Sharma | G06Q 30/04 705/26.81 |
| 2014/0114825 | A1* | 4/2014 | Krikorian | G06Q 30/04 705/34 |
| 2015/0310406 | A1* | 10/2015 | Anderson | G06Q 30/04 705/40 |
| 2020/0234349 | A1* | 7/2020 | Deshmukh | G06Q 30/04 |
| 2021/0272214 | A1* | 9/2021 | Wilczek | G06Q 40/123 |
| 2022/0188920 | A1* | 6/2022 | Vasudevan | G06Q 40/12 |
| 2022/0207441 | A1* | 6/2022 | Arora | G06Q 10/103 |
| 2022/0318897 | A1* | 10/2022 | Brunelle, III | G06Q 40/02 |
| 2022/0343358 | A1* | 10/2022 | Kurtzner, III | G06Q 30/0231 |

OTHER PUBLICATIONS

N. Reimers et al., "Sentence-BERT: Sentence Embeddings using Siamese BERT-Networks," arXiv:1908.10084 [cs.CL], https://arxiv.org/abs/1908.10084, Aug. 27, 2019, 11 pages.

Basware, "Basware Sets Record Pace in Use of SmartCoding," https://www.basware.com/en-en/newsroom/basware-sets-record-pace-in-use-of-smartcoding/ Mar. 6, 2019, 4 pages.

Anonymous, "Kullback-Leibler divergence," https://en.wikipedia.org/wiki/Kullback%E2%80%93Leibler_divergence, retrieved Jan. 20, 2023, 22 pages.

A. Cohen, "fuzzywuzzy 0.18.0," https://pypi.org/project/fuzzywuzzy/, Feb. 13, 2020, 5 pages.

Anonymous, "BERT multilingual base model (cased)," https://huggingface.co/bert-base-multilingual-cased, retrieved Jan. 23, 2023, 6 pages.

N. Reimers, "Sentence Transformers: Multilingual Sentence, Paragraph, and Image Embeddings using BERT & Co." https://pypi.org/project/sentence-transformers/, Jun. 26, 2022, 7 pages.

Anonymous, "word2vec," Google Code Archive, https://code.google.com/archive/p/word2vec/, Jul. 29, 2013, 6 pages.

* cited by examiner

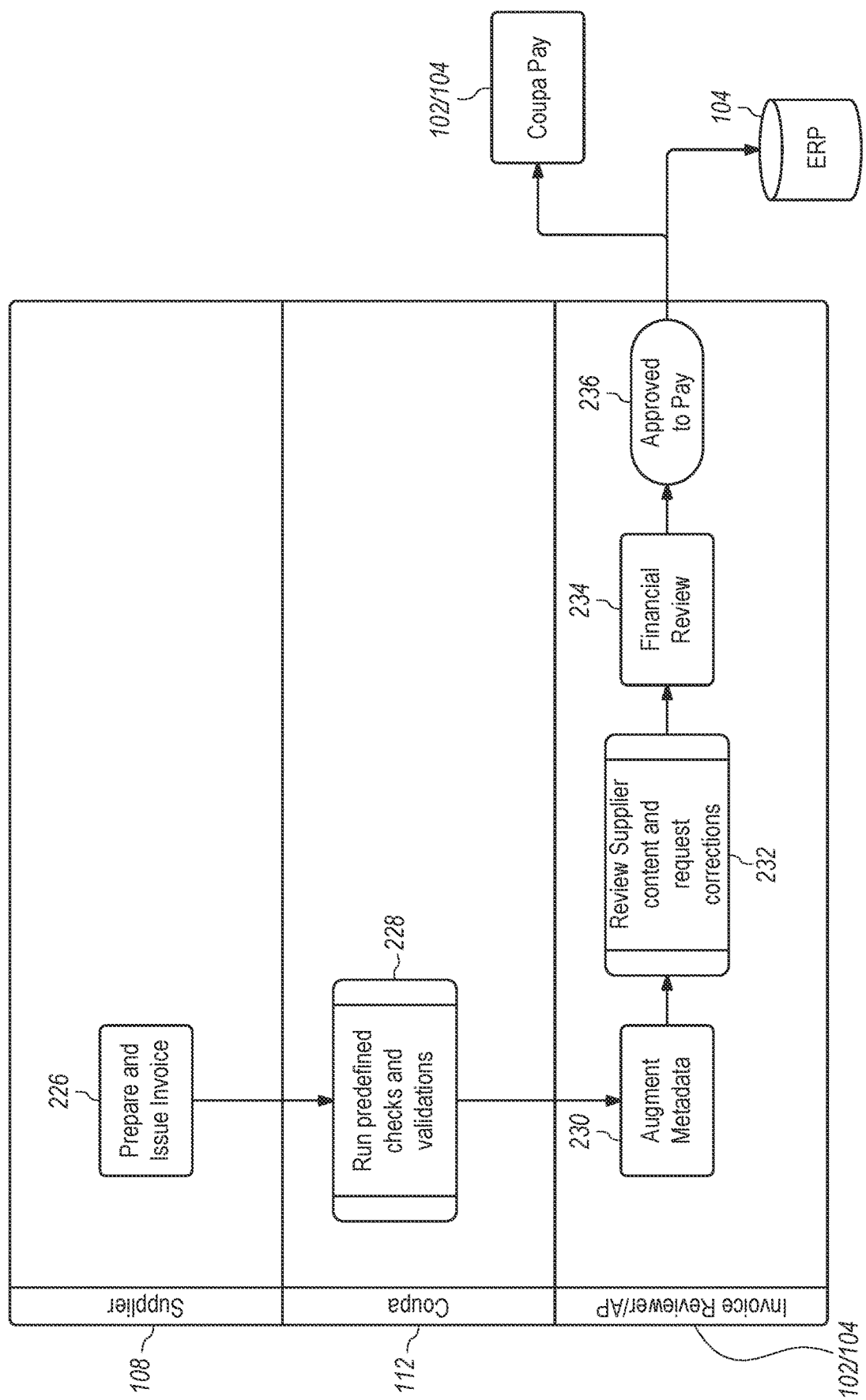

SYSTEMS AND METHODS FOR AUTOMATICALLY RECOMMENDING ACCOUNT CODES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Coupa Software Incorporated.

TECHNICAL FIELD

One technical field of the present disclosure is transaction processing systems, including automated detection of account codes in relation to supplier-customer transactions. Another technical field of the present disclosure is recommendation systems for providing recommendations of account codes on graphical user interfaces.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-implemented spend management, procurement management systems, and other computer systems for accounting or finance functions are widely used. In these systems, customer or buyer financial accounts can be established for managing procurement or purchasing activities. E-procurement activities, accounting and other financial activities may receive electronic digital invoices and may need to link digital invoices or invoice data with an accounting system, for example, with general ledger accounts. E-procurement systems may include generating electronic supplier invoices for submission to customers who may be associated with purchasing activities and products from the suppliers. Buyers may create purchase orders or requisitions, and an Account Receivable (AR) department of a supplier could issue invoices or statements for customers or buyers who are associated with Account Payable (AP) departments or finance operations teams that are in charge of approving payments to the suppliers. Sometimes, invoices are generated with or without purchase orders for spending that is either planned ahead of time with accounting details before the purchase occurs or not pre-planned and that has no categorization for spending. For example, PO-backed invoices are planned ahead of time and have accounting details recorded before a purchase occurs. In contrast, non-PO-backed invoices may lack billing account codes, or may be missing plans and agreements concerning details of the spend, including billing accounts. These deficiencies can require manual entry of data for invoices when non-PO backed invoices are received for processing or may need extra effort and time from AP users or the buyer side to ensure that the AP user's system can review the invoices for their genuineness, and accuracy, and report them.

AP users or invoice requesters usually must input account billing codes manually for non-PO-backed invoices containing a new invoice line. A human-driven process can require someone to look at descriptions with contexts and patterns of the new invoice line, then search for the invoice lines associated with the previously generated account codes or billing codes stored in the historical database and then assign one of the most relevant or matched account codes to the new invoice line. Such a manual process is tedious and labor intense for both AP users and customers.

A general methodology to recommend account codes or billing codes by building a supervised model that takes relevant features as input and outputs an account code directly is not viable for this application, regardless of the model used for feature extraction. A naïve way to process the account or billing codes is by using a Natural Language Processing (NLP) model in combination with a supervised classification model that analyzes features such as line descriptions, supplier chart of accounts, etc., as input and predicts the account code as output. Many NLP models achieve this way of predicting the account codes as output through word embedding using supervised ML models. The supervised models can use a large neural network that considers the surrounding context for word embedding. For example, the ordering of words has a strong influence on the extracted feature vectors after embedding.

However, this approach cannot scale to computer-generated invoices that could have hundreds to thousands of distinct account codes. In such a situation, a single supervised model is required to be trained or customized separately, for each of the different use cases of the computer-generated invoices. Indeed, training or customizing each supervised model, each time, would end in generating many supervised models separately depending upon different types of invoices, which involves significantly more central processing unit (CPU) time, cycles, memory, other storage, or network bandwidth. This way, the customer is enabled to receive as many output codes including the number of distinct account codes for all the invoices. Additionally, each trained supervised model has a fixed output structure which makes it impossible to incorporate a new account code without changing the output structure and complete retraining from scratch. Retraining from scratch involves extensive processing time and the burden on infrastructure and resources which may be infeasible. Existing systems do not provide effective means of determining missing account details for non-PO-backed invoices or determining accounts for setting up purchase orders.

Therefore, there is a need for a computer-implemented method or system that simplifies the use of machine learning techniques that are able to automatically recommend accurate or most relevant account codes or billing codes for supplier-customer transactions. For example, there is a need for methods and systems with the ability to automatically recommend account codes or billing codes for any kind of invoice, whether invoices are associated with purchase orders or non-PO-backed. A similar need exists for business spend management (BSM) areas where users must undertake manual action to determine the billing accounts that are associated with expenses, setting up requisitions and contracts, source to contract flows, or payment requests.

SUMMARY

The appended claims may serve as a summary of the invention.

BRIEF DESCRIPTION OF THE DRAWINGS

In the drawings:

FIG. 2D illustrates an example process of augmenting metadata for account code entry to one or more invoice data, according to an embodiment;

DETAILED DESCRIPTION

Figure 1:
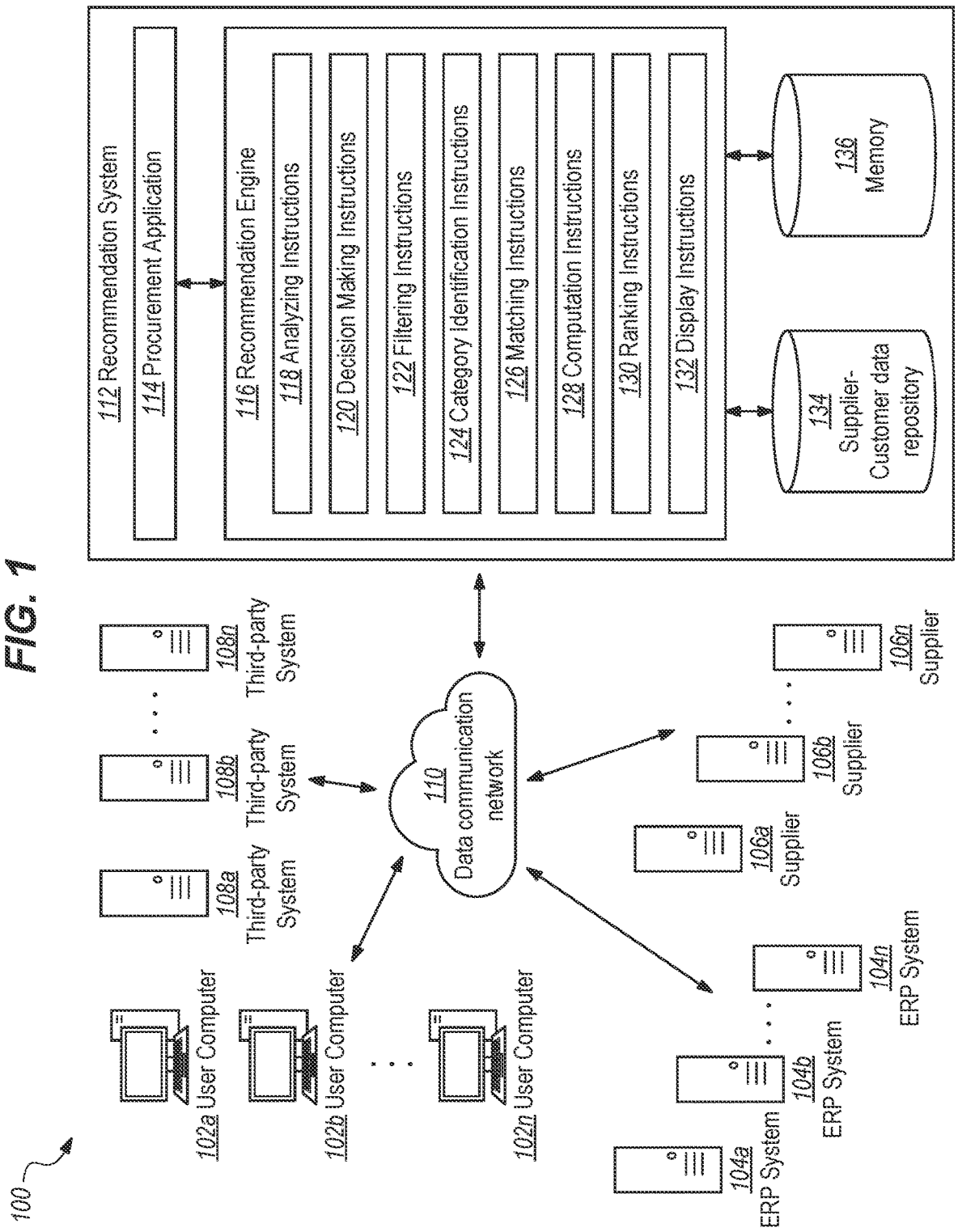
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections according to the following outline:

1.0 GENERAL OVERVIEW
2.0 EXAMPLE NETWORKED COMPUTER SYSTEM
3.0 EXAMPLE AUTOMATED INVOICE DETECTION PROCESS
4.0 OVERVIEW OF RECOMMENDING ACCOUNT CODES
5.0 EXAMPLE FLOWCHART OF RECOMMENDING ACCOUNT CODES
6.0 EXAMPLE GRAPHICAL USER INTERFACE FOR DISPLAYING ACCOUNT CODES
7.0 EXAMPLE GRAPHICAL USER INTERFACE FOR EDITING ACCOUNT CODES
8.0 IMPLEMENTATION EXAMPLE—HARDWARE OVERVIEW

1.0 GENERAL OVERVIEW

Machine learning techniques are provided to automatically detect account codes for one or more items of invoice data and recommend the account codes that are most accurate or relevant to the pattern or type of invoice data. In an embodiment, the account codes relevant to invoice line strings containing description lines, characters, context, and patterns, pertaining to particular supplier-customer information, are recommended using a comparison to historical invoices corresponding to the same supplier-customer information. In an embodiment, natural language processing (NLP) models can be used to interpret invoice line strings along with description lines, characters, texts, contexts, and patterns of the invoice data. The invoice line strings are filtered using a filtering process to extract a filtered format of the invoice data containing filtered description lines and texts. The description lines and texts with a description of order items and commodity items along with their contexts and patterns define certain categories that the description lines and texts belong to, and those categories are identified. The identified categories are matched with historical categories corresponding to the description lines and texts of the prestored invoices. The invoice data, including the identified categories, is compared with the historical invoices and corresponding historical categories to compute a similarity score. The account codes corresponding to the historical invoices, based on the higher similarity score, are recommended for mapping to the invoice data. In an embodiment, a computer-implemented method of detecting account codes and displaying the account codes on a graphical user interface (GUI) is disclosed.

The disclosure provides ways to effectively consolidate patterns from across all spend indications, including invoices and purchase orders, and then deliver recommendations by translating and/or mapping invoices to customer specifications and general ledger account structure. Embodiments can be used for applications other than augmenting invoices with account data. For example, embodiments can be used for invoice category-specific process optimization, by which users can elect to automatically pay some invoices, while for others, users may want purchasing users to review and line up similar transactions for sourcing or pre-approval.

In various embodiments, aspects, and features, the disclosure encompasses the subject matter of the following numbered clauses:

1. A computer implemented method of detecting account codes and displaying the detected account codes on a graphical user interface comprising receiving, by a recommendation engine of a recommendation system communicatively coupled over a data communication network, one or more items of invoice data comprising at least one of one or more invoice descriptions and one or more invoice characters from one or more user computers, each of the one or more invoice descriptions and the one or more invoice characters defines contexts and patterns, wherein each of the one or more invoice data comprising a supplier-customer information that corresponds to a supplier-customer transaction; analyzing, by the recommendation engine, the at least one of the one or more invoice descriptions and the one or more invoice characters associated with the corresponding contexts and patterns; determining, by the recommendation engine, that an amount of the one or more invoice characters is more than a preset threshold number of characters based on the analysis, for performing: matching, by the recommendation engine, each of the one or more invoice data, comprising the one or more invoice characters, that is associated with a supplier-customer information with one or more predefined historical invoice data that corresponds to the same supplier-customer information, wherein each of the contexts and the patterns associated with each of the one or more invoice data is matched with one or more predefined contexts and patterns of the one or more predefined historical invoice data that corresponds to the same supplier-customer information; computing, by the recommendation engine, a similarity score for each of the one or more invoice data associated with the supplier-customer information based on the matching with the one or more predefined historical invoice data that corresponds to the same supplier-customer information; and displaying, by the recommendation engine on the graphical user interface, one or more first recommendations including one or more first account codes based on the computed similarity score of each of the one or more invoice data that is corresponding supplier-customer information to map the one or more first account codes to each of the one or more invoice data based on the similarity score; determining, by the recommendation engine, that an amount of the one or more invoice characters is not more than the preset threshold number of characters based on the analysis, for performing: filtering, by the recommendation engine, the one or more invoice descriptions of the one or more invoice data based on a predetermined constraints to extract one or more filtered invoice data comprising filtered description lines; identifying, by the recommendation engine, one or more categories associated with each of the filtered description lines of the one or more filtered invoice data; matching, by the recommendation engine, each of the identified one or more categories, including corresponding contexts and patterns that is associated with a supplier-customer information with one or more predefined historical categories associated with predefined invoice description that corresponds to the same supplier-customer information, wherein each of the contexts and the patterns associated with each of the filtered description lines of the one or more filtered invoice data is matched with one or more predefined contexts and patterns of the one or more predefined historical invoice data that corresponds to the same supplier-customer information; computing, by the recommendation engine, a categorical similarity score for each of the one or more categories associated with the supplier-customer information based on the matching with the one or more predefined historical categories associated with the predefined invoice description one or more predefined historical invoice data that corresponds to the same supplier-customer information; and displaying, by the recommendation engine on the graphical user interface, one or more second recommendations including one or more second account codes based on the computed categorical similarity score of each of the one or more categories to map the one or more second account codes to the one or more invoice data.

2. The method of clause 1, wherein the categorical similarity score is computed using Kullback-Liebler (KL) divergence of each of the one or more categories of each of filtered description lines, associated with the corresponding supplier-customer information, with the one or more predefined historical categories with the predefined invoice description that corresponds to the same supplier-customer information.

3. The method of clause 1, further comprises ranking the recommendations including the one or more first account codes, and the one or more second recommendations including the one or more second account codes according to one or more parameters comprising most recently used account codes, favorites of account codes, prior account codes that are used, a frequency of account codes being used, flagged account codes, highlighted account codes, prioritized account codes, labeled account codes, pointer account codes, tagged account codes, or a combination thereof.

4. The method of clause 3, further comprising: ranking, by the recommendation engine via ranking application, the one or more first recommendations including the one or more first account codes according to the similarity score for each of the one or more invoice data that is associated with the corresponding supplier-customer information; and displaying, by the recommendation engine on the graphical user interface, the ranking of the one or more first recommendations including the one or more first account codes.

5. The method of clause 3, further comprising: ranking, by the recommendation engine via the ranking application, the one or more second recommendations including the one or more second account codes according to the categorical similarity score for each of the one or more categories of the one or more filtered invoice description lines of the one or more filtered invoice data that is associated with the corresponding supplier-customer information; and displaying, by the recommendation engine on the graphical user interface, the ranking of the one or more second recommendations including the one or more second account codes.

6. The method of clause 1, wherein the identification of the one or more categories associated with each of the filtered description lines of the one or more filtered invoice data comprising classifying each text of the one or more filtered description lines into the one or more categories based on the contexts and patterns associated with each text of the one or more descriptions.

7. The method of clause 1, further comprising: receiving, by the recommendation engine, a new invoice data comprising invoice descriptions and invoice characters associated with a new supplier-customer information corresponding to a new supplier-customer transaction, wherein each of the invoice descriptions and the one or more invoice characters defines contexts and patterns; filtering, by the recommendation engine, the invoice descriptions of the new invoice data based on the predetermined constraints to extract a new filtered invoice data comprising description lines; identifying, by the recommendation engine, categories associated with each of the description lines of the new filtered invoice data; matching, by the recommendation engine, each of the identified categories, including corresponding contexts and patterns that is associated with the new supplier-customer information with the one or more predefined historical categories associated with predefined invoice descriptions that corresponds to one or more predetermined supplier-customer information, wherein each of the contexts and the patterns associated with each of the invoice descriptions of the new invoice data is matched with one or more predefined contexts and patterns of the one or more predefined historical invoice data that corresponds to the one or more predetermined supplier-customer information; computing, by the recommendation engine, a categorical similarity score for each of the matched categories associated with the new supplier-customer information with the one or more predefined historical categories associated with the predefined invoice description that corresponds to the one or more predetermined supplier-customer information; and displaying, by the recommendation engine on the graphical user interface, recommendations including account codes based on the computed categorical similarity score of each of the categories to map the account codes to the new invoice data.

8. The method of clause 1, wherein the graphical user interface is communicatively connected to the one or more user computers, one or more enterprise resource planning (ERP) computer systems, one or more third-party systems, and the recommendation system, each of the one or more user computers, the one or more ERP computer systems, and the one or more third-party systems is communicatively coupled to the data communication network.

9. The method of clause 1, wherein the one or more invoice data is expense report, invoice processing, purchase orders, requisitions, accounts payable, and any supplier-customer related transactions.

10. The method of clause 1, wherein each of the supplier-customer information, the one or more predefined historical invoice data, the one or more predefined contexts and patterns of the one or more predefined historical invoice data, the preset threshold number of characters, the predetermined constraints and the one or more parameters are stored in a memory of the recommendation system.

11. A computer-implemented method describing to execute method of detecting account codes and displaying them on a GUI based on determining that an amount of the one or more invoice characters is not more than the preset threshold number of characters based on the analysis followed by a filtering process on the one or more invoice as shown and described in connection with FIG. 3. In an embodiment, data representing patterns across all spend sources including invoices and purchase orders can be consolidated to deliver recommendations by translating and/or mapping invoices, Pos, or combinations according to user specifications and their general ledger account structure.

12. One or more non-transitory computer-readable data storage media storing one or more sequences of instructions which, when executed using one or more processors, cause the one or more processors to execute the methods of any of clauses 1 to 10.

13. One or more non-transitory computer-readable data storage media storing one or more sequences of instructions which, when executed using one or more processors, cause the one or more processors to execute the methods of detecting account codes and displaying on a GUI based on determining that an amount of the one or more invoice characters is not more than the preset threshold number of characters based on the analysis followed by filtering process on the one or more invoice as shown and described in connection with FIG. 2.

14. A distributed computer system, comprising: one or more processors; one or more non-transitory computer-readable data storage media coupled to the one or more processors and storing one or more sequences of instructions which, when executed using the one or more processors, cause the one or more processors to execute the methods of any of clauses 1 to 10.

Technical Benefits and Practical Applications

The disclosure provides automated methods to increase the efficiency of digital data processing by generating data items that do not exist in data records using artificial intelligence techniques. The techniques also can enhance managing of account code automation or billing code automation by detecting the most accurate or most relevant account or billing code based on descriptions in invoice data and displaying recommendations in a GUI for review or confirmation. Embodiments can use machine learning (ML) and artificial intelligence models that are trained to detect the most accurate account code with less response time. This improves processing efficiency for selecting accurate recommended account or billing codes for invoice data.

Embodiments can be used in large-scale, multi-tenant, distributed systems that process large numbers of non-PO-backed invoices. In embodiments, the automatic detection of account codes based on the descriptions, context, and patterns of the invoice data reduces wait times during which invoices are in a pending action status and reduces the manual effort of users. Embodiments can be applied to all incoming invoices regardless of the varying number of distinct account or billing codes mapped across the corresponding historical invoices. Therefore, networked computers and systems involved in invoice processing use fewer network resources, buffer memory, CPU cycles, and other resources.

2. STRUCTURAL & FUNCTIONAL OVERVIEW 2.1 Example Distributed Computer System Architecture FIG. 1 illustrates a distributed computer system showing the context of use and principal functional elements with which one embodiment of automatic detection of account codes and displaying on the graphical user interface (GUI) could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the descriptions and claims in this disclosure, are intended to present, disclose and claim a technical system and technical methods in which specially programmed computers, using a special-purpose distributed computer system 100 design, execute functions that have not been available before to provide a practical application of computing technology to the problem of management of account code or billing code automation, detection, and displayed on a GUI. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1, a distributed computer system 100 comprises one or more user computers 102a-102n that are communicatively coupled to a recommendation system 112 via a data communication network 110. In an embodiment, computer system 100 also comprises one or more enterprise resource planning (ERP) systems 104a-104n, one or more supplier systems 106a-106n, and one or more third-party systems 108a-108n, and each of them is communicatively coupled to the recommendation system 112 via the network 110. Each of the one or more user computers 102a-102n can comprise any kind of computing device such as a desktop computer, laptop computer, tablet computer, mobile computing device, or workstation. For clarity, FIG. 1 shows three user computers 102, but in practical embodiments, computer system 100 can include thousands to millions of user computers depending upon the processing capacity of recommendation system 112. The designation "n" in reference characters such as "102n" means that in embodiments the actual number of elements corresponding to a reference character is unlimited.

The ERP systems 104a-104n may include ERP software as a service system (e.g., NetSuite™) and more traditional ERP systems (e.g., SAP™, Oracle™, Great Plains™, etc.). The third-party systems 106a-106n may include non-ERP systems that provide, or use spend data including, for example, accounts payable systems (e.g., Scan One™) invoicing systems, corporate credit card systems, and data warehouse systems.

The one or more user computers 102a-102n, the one or more ERP systems 104a-104n, the one or more third-party systems 106a-106n, the one or more supplier systems 108a-108n and the recommendation system 112 can be implemented using server computing technology such as a server farm, a cloud computing platform, or a parallel computer, one or more virtual compute instances and/or virtual storage instances, and/or instances of a server-based application. In an embodiment, each of the one or more user computers 102a-102n, the ERP systems 104a-104n, the third-party systems 106a-106n, and the supplier systems 108a-108n including the recommendation system 112 executes application programs. For user computers 102a-102n, the application programs can include a browser, and other elements of FIG. 1 can implement HTTP servers to interoperate with browsers. The browser can comprise any application program that is compatible with open protocols such as HTTP and HTML; commercially available examples include CHROME, SAFARI, EDGE, INTERNET EXPLORER, or FIREFOX.

In an embodiment, each of the user computers 102a-102n, the ERP systems 104a-104n, the third-party systems 106a-106n, and the supplier systems 108a-108n may be associated with one or more entities including, but not limited to, business entities, industrial entities, such as companies, institutions, organization, corporations, schools, hospitals, government agencies, and any other business-related entities that typically have sophisticated systems for managing their business and financial billing accounts. The one or more entities may have buyer computers and/or supplier computers. The one or more entities may have accounts receivable (AR) computers and accounts payable (AP) computers that are in charge of invoicing and making payments, respectively. Specifically, AR computers may be associated with suppliers who provide, or supply goods, commodities, and services to customers and are associated with generating invoices for receiving payments from customers. Buyer computers, supplier computers, AR users, and AP users can be associated with user accounts. Throughout this disclosure, all references to "user" or "users" are specified for convenience but correspond to user accounts or user computers that execute the technical steps described in the disclosure. Thus, even where the terms "user" or "users" appear, all steps and functions of the disclosure are intended as computer-implemented steps or technical steps, and not manual, human-performed, or abstract steps, each of which is hereby expressly excluded from the scope of the claims.

In an embodiment, the AR users interoperate with one or more of the third-party systems 106a-106n and the supplier systems 108a-108n for generating one or more invoice data. The suppliers or AR users may digitally generate the one or more invoice data including, but not limited to, digitally stored invoices or statements relating to services and commodities or products or goods. The AR users or suppliers define the invoice data with description lines, contexts, patterns, and details of items that define specific products or services being purchased. In an embodiment, AP users may be associated with buyers or customers who purchase goods, commodities, and services from the suppliers and are associated with approving invoices for making payments to the suppliers. In an embodiment, the AP users interoperate with one or more of the user computers 102a-102n, and the ERP systems 104a-104n and may be associated with third-party systems 106a-106n that are configured to receive the one or more invoice data from suppliers.

In an embodiment, the user computers 102a-102n, the ERP systems 104a-104n, and the third-party systems 106a-106n may comprise one or more memories and/or networked digital data storage such as digital data repositories. The one or more memories and data repositories are configured to store invoice information and details pertaining to suppliers and customers, including but not limited to those that were recently approved or that were approved in the past. In an embodiment, pre-approved invoices are stored as predefined historical invoice data which may in a form of any of a mapping table, lookup table, data structures, relational database, object database, flat file system, SQL database, or no-SQL database. In an embodiment, the one or more memories and data repositories are populated using replication or duplication entries from supplier-customer data repository 134 and memory 136 of the recommendation system 112 which are trained or customized over time for quick lookup. The training or customizing is described in detail in other sections herein. The user computers 102a-102n, the ERP systems 104a-104n, and the third-party systems 106a-106n may also comprise one or more processors that are configured to implement all programming instructions that are programmed or configured to host or execute functions of the recommendation system 112, which is described in later sections herein.

In an embodiment, customers, buyers, may cause one or more of the user computers 102a-102n, ERP systems 104a-104n, and/or third-party systems 106a-106n to interoperate with the recommendation system 112 via the data communication network(s) 110. The data communication network 110 may be implemented by any medium or mechanism that provides for the exchange of data between the various user computers and systems including the recommendation system 112. Examples of the data communication network 110 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc. The data exchanged may be formatted in a variety of different ways including for example as HTML, CSS, Javascript, XML, JSON, etc.

In one embodiment, the integration of systems over the data communication network(s) 110 may be accomplished using one or more data integration protocols. One possible integration protocol may use flat files (e.g., CSV flat files) uploaded to and downloaded from a secure file transfer protocol (SFTP) server operated by any of the buyer computers that are able to access and implement the recommendation system 112. The flat files may be CSV files, for example, that contain the one or more invoice data including descriptions, line strings, texts, and words along with contexts, patterns, and other associated details pertaining to the particular supplier-customer information of a particular supplier-customer transaction. In another embodiment, another possible integration protocol for importing the one or more invoice data is by using a REST API offered by servers associated with the recommendation system 112. For example, the flat file integration protocol may be used for bulk import of supplier-customer information, and the REST API integration protocol may be used for real-time import of supplier-customer information including the one or more invoice data associated with the particular supplier-customer transaction.

The purpose of the integration may be to exchange data, or to import the one or more invoice data and its associated information to or from the recommendation system 112. Such records and data imported to or from the recommendation system 112 to or from the user computers 102a-102n, ERP systems 104a-104n, third-party systems 106a-106n and supplier systems 108a-108n, may be processed by various instructions stored in the recommendation system 112, including instructions that implement techniques disclosed herein for improving detection and recommendations of the one or more account codes or one or more billing codes on a GUI for viewing from the customers and suppliers.

The recommendation system 112 is implemented using one or more computing devices that are programmed for processing invoice data of one or more items and providing recommendations to one or more of the user computers 102a-102n, the ERP systems 104a-104n, the third-party systems 106a-106n, and the supplier systems 108a-108n. In various embodiments, the recommendation system 112 can comprise any of a single-machine processor, multi-processor machine, a processor or machine cluster, and/or one or more virtual compute instances and/or virtual storage instances to process the invoice data and then lookup for accurate or relevant account codes for the one or more items of invoice data.

The recommendation system 112 comprises or executes a web server including or comprising an HTTP server that can process user requests, transmit responses including HTML payloads with dynamically generated web pages, and can include a firewall, load balancer, or other infrastructure to manage a large number of requests from user computers 102a-102n.

The recommendation system 112 can execute in a multi-tenant, multi-instance architecture in which large numbers of requests of user computers 102a-102n are processed, using separate or shared data storage with security controls. In one embodiment, recommendation system 112 implements, is associated with, or is integrated with an e-procurement system that facilitates entering, tracking, paying, and reporting on purchase orders, invoices, and other digital electronic transaction documents for transactions between buyer computers and supplier computers. In other embodiments, recommendation system 112 forms part of a business computer system that receives invoices for functions other than e-procurement; thus, the recommendation system can interoperate in any business or financial computer system that may receive invoices which may be linked with accounts such as general ledger accounts. Aside from invoice processing, various embodiments can be programmed to support account code processing for entry of employee or business expenses, setting up requisitions and contracts (source to contract flows), and payment requests.

FIG. 1 also illustrates example components of a recommendation system in one embodiment. In various embodiments, one or more of the functional components can be implemented as software components, general or specific-purpose hardware components, firmware components, or any combination thereof. The recommendation system 112 comprises a procurement application 114, and a recommendation engine 116, with access to supplier-customer data repository 134 and memory 136, the functions of which are described in other sections herein. The procurement application 114, and the recommendation engine 116, can be programmed as multiuser software-as-a-service (SaaS) applications that interoperate with user computers 102a-102n, ERP system 104a-104n, third-party systems 106a-106n and supplier system 108a-108n via browsers.

The procurement application 114 can be programmed to receive, create, share, and manage, the one or more invoice data that is generated via supplier computers 108a-108n. In an embodiment, the one or more invoice data are in-memory records of requests which are initiated by supplier computers, for mapping one or more items of invoice data with accurate or relevant account codes. In an embodiment, the one or more invoice data may be a single invoice or multiple invoices and can include digitally stored data representing requests and/or metadata for requests, models, and results. The one or more invoice data may be enterprise invoices, purchase orders, expense reports, billing entries, requisitions, electronic invoices, pro forma invoices, bill of sale, debit notes, credit notes, remittance slips, manual entries of bills, paper slips, and other digital electronic documents associated with procurement of goods or services.

In an embodiment, the one or more invoice data may be incoming invoice data that is mapped with billing or account codes. The one or more invoice data may comprise invoice line strings that include one or more invoice descriptions and one or more invoice characters. Each of the one or more invoice descriptions and each of the one or more invoice characters defines contexts and patterns of the associated supplier-customer transactions. The invoice line strings containing the one or more descriptions may also include words, texts, characters and lines defining item description, name of items, price details, commodity item information, and other information related to the item or service being purchased. In an embodiment, the one or more descriptions are different from the one or more characters that may include numbers or numeric characters in the invoice line strings. The one or more invoice data may be associated with non-PO invoices containing non-PO invoice line strings. Each of the one or more invoice data or incoming invoice data may be associated with a particular supplier and customer information that corresponds to the particular supplier and customer transaction.

The recommendation system 112 comprises stored program instructions organized as the electronic recommendation engine 116, which in turn can comprise computer-executable instructions including, but not limited to, analyzing instructions 118, decision-making instructions 120, filtering instructions 122, category identification instructions 124, matching instructions 126, computation instructions 128, ranking instructions 130, and display instructions 132.

The analyzing instructions 118 are programmed or configured to analyze each invoice line string including at least one of the one or more invoice descriptions and the one or more invoice characters associated with the corresponding contexts and patterns. In an embodiment, the one or more invoice data including words, texts, characters, and lines defining item description, name of items, price details, commodity item information, service details being procured, and other information related to the item or service being purchased are also analyzed. In one embodiment, each invoice line string is considered as a sentence containing words and phrases which are mostly individual items mentioned with quantities and model numbers being purchased. Analyzing these invoice line strings provides the semantics of all individual words and phrases as well as the semantics meaning of the entire sentence.

The decision-making instructions 120 are programmed or configured to determine whether an amount of the one or more invoice characters contained in the one or more invoice data is more than a preset threshold number of characters based on the analysis. In an embodiment, the decision-making instructions 120 are programmed or configured to determine whether the invoice line strings contain mostly characters like mostly numeric characters or numbers or pure numbers other than the one or more descriptions, words, or phrases.

The filtering instructions 122 are programmed or configured to filter the one or more invoice descriptions of the one or more invoice data based on predetermined constraints to extract one or more filtered invoice data comprising filtered description lines. In an embodiment, the filtering instructions 122 provide a filtering process where descriptions line items, words, and phrases in the invoice line strings are cleaned up to create a dictionary and training corpus.

The category identification instructions 124 are programmed or configured to identify one or more categories associated with each of the filtered description lines of the one or more filtered invoice data. In an embodiment, each description line, words, phrases, and texts along with their context and patterns is classified into a number of different categories, keywords, topics, latent topics, and commodity categories. In an embodiment, one or more categories may generate a new feature vector for the one or more invoice data.

The matching instructions 126 are programmed or configured to match each of the one or more invoice data having the one or more invoice characters with one or more predefined historical invoice data. Additionally, contexts and the patterns associated with each of the one or more invoice data are also matched with one or more predefined contexts and patterns of the one or more predefined historical invoice data. In one embodiment, both incoming invoice data, having the invoice characters along with associated contexts and patterns, and the one or more predefined historical invoice data, along with predefined contexts and patterns, may belong to same supplier-customer information to perform the matching operation. The matching instructions 126 are programmed or configured to match each of the identified one or more categories or new feature vector, including corresponding contexts and patterns, with one or more predefined historical categories associated with predefined invoice description of the one or more predefined historical invoice data. Additionally, contexts and the patterns associated with each of the filtered description lines of the one or more filtered invoice data are matched with one or more predefined contexts and patterns of the one or more predefined historical invoice data. In one embodiment, both incoming invoice data, having the filtered description lines along with associated contexts and patterns, and the one or more predefined historical invoice data, along with predefined contexts and patterns, may belong to same supplier-customer information to perform the matching operation.

The computation instructions 128 are programmed or configured to compute a similarity score for each of the one or more invoice data, having the new feature vector, with the one or more predefined historical invoice data having a predefined category feature vector or topic feature vector. The computation instructions 128 are programmed or configured to compute a categorical similarity score for each of the one or more categories associated with the supplier-customer information based on the matching with the one or more predefined historical categories associated with the predefined invoice description that corresponds to the same supplier-customer information. In an embodiment, KL divergence between the category feature vector or topic feature vector of predefined historical invoice data and the new feature vector is computed. The KL divergence computes the categorical similarity score for each of the one or more categories or relative entropy. In an embodiment, based on the computed similarity score, one or more first account codes associated with the same supplier-customer information are detected from the historical invoice data and are provided as recommendations. In an embodiment, based on the computed categorical similarity score, one or more second account codes are detected from the historical invoice data that corresponds to the same supplier-customer information as that of the incoming invoice data and are provided as recommendations.

The ranking instructions 130 are programmed or configured to rank the recommendations of the first account codes and of the second account codes for corresponding incoming invoice data. In an embodiment, the account codes detected are the predicted account codes and corresponding recommendations are predicted recommendations based on the computation of the similarity score vectors. The ranking instructions 130 are programmed or configured to rank the predicted account codes and rank the predicted recommendations.

The display instructions 132 are programmed or configured to provide a visual representation of the recommendations of account codes in a GUI for the corresponding one or more items of invoice data. The display instructions cause displaying visual interfaces on display devices associated with the customers for reviewing and approving the accurate account codes for the one or more items of invoice data. Additionally, the one or more account codes are automatically added to the incoming invoice data and the one or more items of invoice data with no requirement of GUI input from the user(s).

The supplier-customer data repository 134 may be a storage unit that may be in a form of any of mapping table, map entries, a list format, a tagged format, lookup table, data structures, relational database, object database, flat file system, SQL database, or no-SQL database, an object store, a graph database, or other data storage. The supplier-customer data repository 134 is configured to store invoice information and details pertaining to all suppliers and customers that were recently approved or that were approved in the past. In an embodiment, supplier-customer data repository 134 is configured to store past approved or pre-approved invoices of all the suppliers and customers according to the supplier and customer link relationship. The past approved or pre-approved invoices, pertaining to all the supplier and customers according to the supplier and customer link relationship, are also associated with line strings with context and patterns that are linked to description lines, words, phrases, texts, semantics, metadata, trend, behavior, line items in the description, service render information, categories related to line strings, products, and items, commodity or product to purchase details and other information related to the invoices. The data repository 134 is pre-trained to have such supplier-customer-related entries according to the semantics of each word and phrases in the line strings with contexts, patterns, and semantics of all descriptions in the line strings.

In an embodiment, a natural language processing (NLP) model is used to pre-train the data repository 134. The one or more invoice data including pre-approved invoices and approved invoices in the past are used to pre-train the NLP model based on the line strings comprising line item descriptions in those invoices. In an embodiment, the NLP model uses a natural unsupervised model for pre-training the data repository 134. The natural unsupervised model may be any of several unsupervised word embedding models including, but not limiting to, the term frequency-inverse document frequency (TF-IDF) model and a latent Dirichlet allocation (LDA) model. In an embodiment, the LDA model may implement a dimensionality reduction algorithm that uses an Expectation-Maximization algorithm for pre-training the mixture model or hybrid model.

Figure 2A:
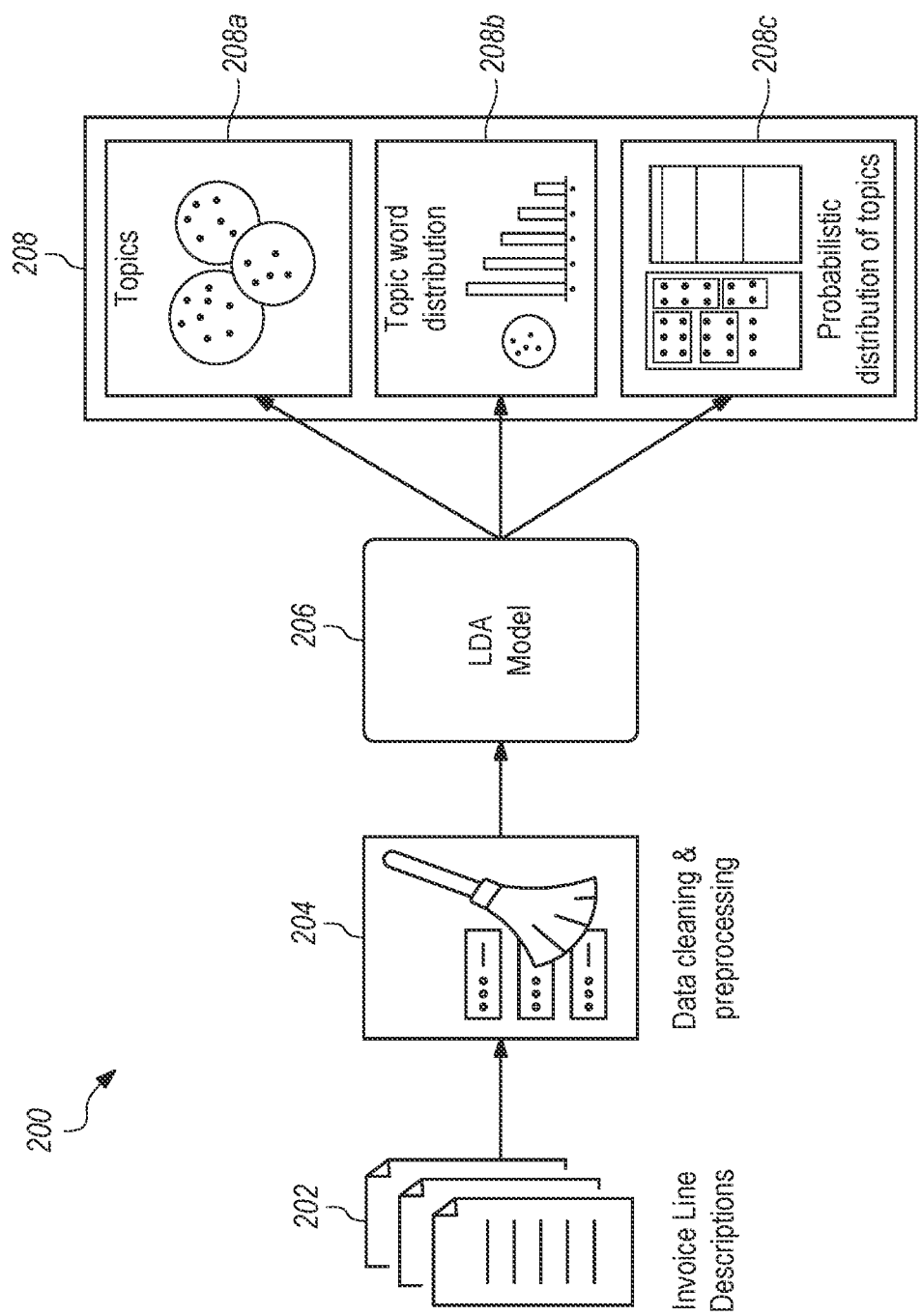
FIG. 2A illustrates an example filtering process to generate a dictionary and training corpus for extracting feature vectors containing different topics and latent topics, according to an embodiment.

Referring to FIG. 2A, in an embodiment, an example filtering process 200 is illustrated which involves data cleaning to generate a dictionary and training corpus for extracting category feature vectors or topic feature vectors containing different topics and latent topics. At block 202, the invoice line strings containing line item descriptions, contexts, and patterns are received via various past or recently generated invoice requests. At block 204, each line item description of all the invoices may be cleaned up and preprocessed by using filtering instructions 122. Specifically, at block 204, the filtering process involves cleaning up each line item description based on predetermined constraints. The filtering process involves cleaning up words, phrases, texts, sentence characters, and other related items in the descriptions. The predetermined constraints for data cleaning may include various steps such as lower-case modification, removal of punctuation, stop words, and numeric characters, lemmatization, tokenization, generation of bi-grams and tri-grams, and filtering out words or phrases that are too short, for example, less than two characters, filtering out words that are too long. In an embodiment, bi-grams and tri-grams are generated using, for example, Gensim Phraser class. In an embodiment, thresholds involved with filtering out words that are too short or too long are determined as $5^{th}$ Quantile and the $95^{th}$ Quantile of the distribution of the length of words in the training data. The filtering process generates a dictionary and training corpus for category feature vector or topic feature vector extractions.

The filtered line item description is an input to block 206, where various unsupervised models use the filtered line item descriptions for training the models. For example, the LDA models use the filtered line item descriptions for computing a feature vector containing different topics, categories, latent topics, for each of line item description. The length of the computed feature vector is the same as the number of unique tokens in the dictionary including bi-grams and tri-grams. This feature vector can be applied to each invoice request separately to build an invoice-specific feature matrix for similarity comparison between the incoming invoice data and predefined historical invoice data.

In an embodiment, at block 206, the information of line item description may be represented by a sequence of high-dimensional one-hot encoded tokens that are of the size of the dictionary. The information of the line item description may be condensed into a number of different topics, categories, and latent topics by LDA model. The number of different topics, categories and latent topics is selected based on criteria including, but not limited to, perplexity criteria and coherence criteria. In an embodiment, the perplexity criteria define a measure of the "degree of surprised" of the model when it is applied to a dataset of line item descriptions. The perplexity criteria achieve a lower perplexity score when applied to unseen invoice line item descriptions or new line item descriptions corresponding to the same historical invoice data. The lower perplexity score defines the correct number of latent topics, and categories are uncovered to implement any kind of the invoice data. In an embodiment, the coherence criteria measure how coherent are the top words, in each topic, category, or latent topic. The coherence is measured using a UMass measure that involves counting the number of co-occurrences of each pair of top words in each topic and then calculating an average of the number of co-occurrences of all pairs of top words. The higher the coherence score, the better the topics or categories or latent topics extraction. In an embodiment, the coherence criteria perform grouping of the words, texts, and phrases that are frequently occurring together. This enables interpreting the semantics of contextual information for category or topic feature extraction. According to the selection of the number or count of different topics, categories and latent topics, LDA model perform category or topic feature vector extraction for each line item description for pre-training the model for the corresponding supplier-customer information.

In response to condensation by the LDA model at block 206, the category or topic feature vector containing different topics, categories, and latent topics is computed for each line item description. Each category or topic feature vector containing different topics, categories, latent topics is associated with a weight factor indicating how likely each line item description belongs to the different topics, categories, and latent topics.

Figure 2B:
FIG. 2B illustrates an example of word clouds and topics extracted for an invoice data, according to an embodiment.
Figure 2C:
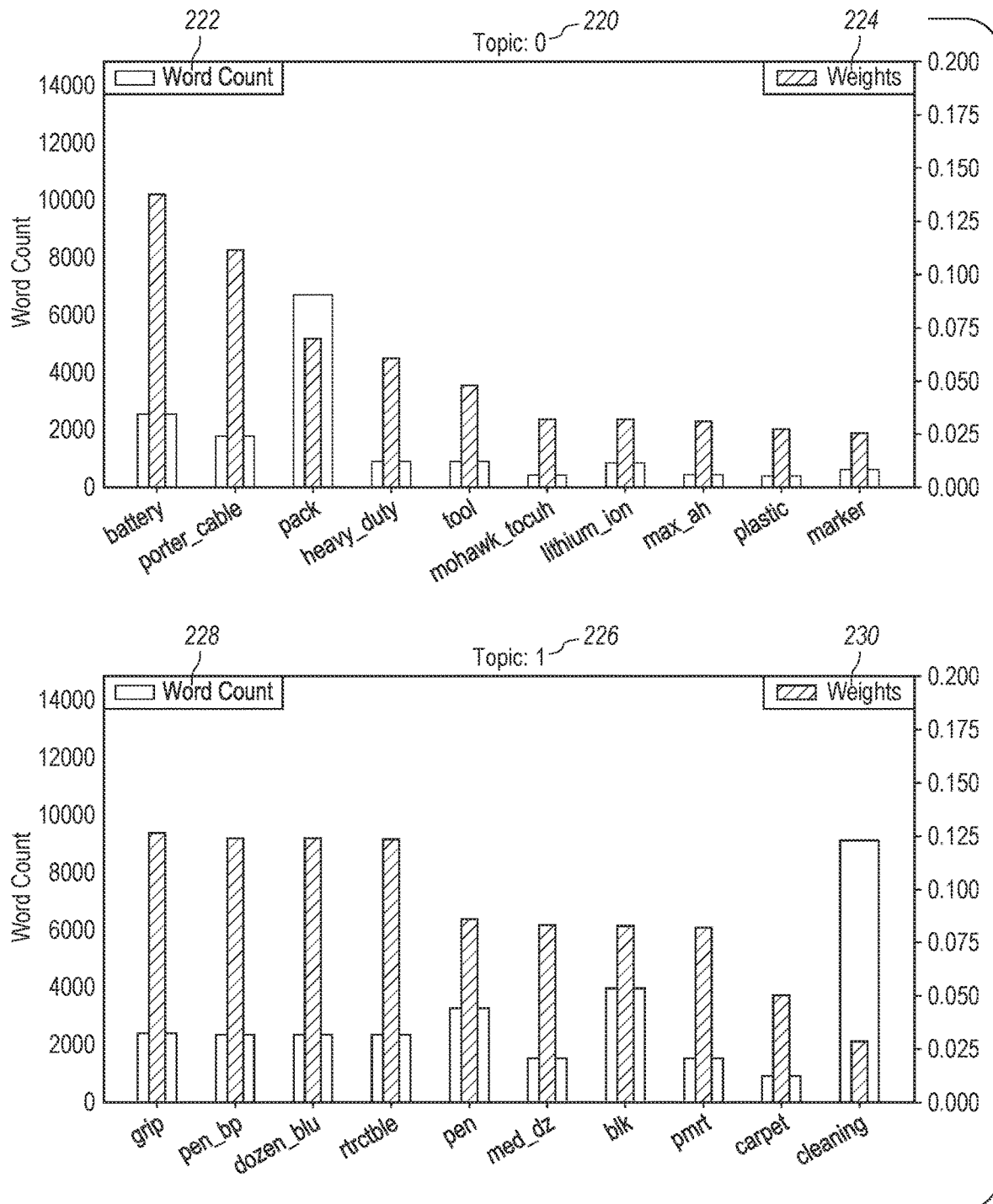
FIG. 2C illustrates an example of weights and counts of words in the different topics, categories, and latent topics, according to an embodiment.
Figure 2C:
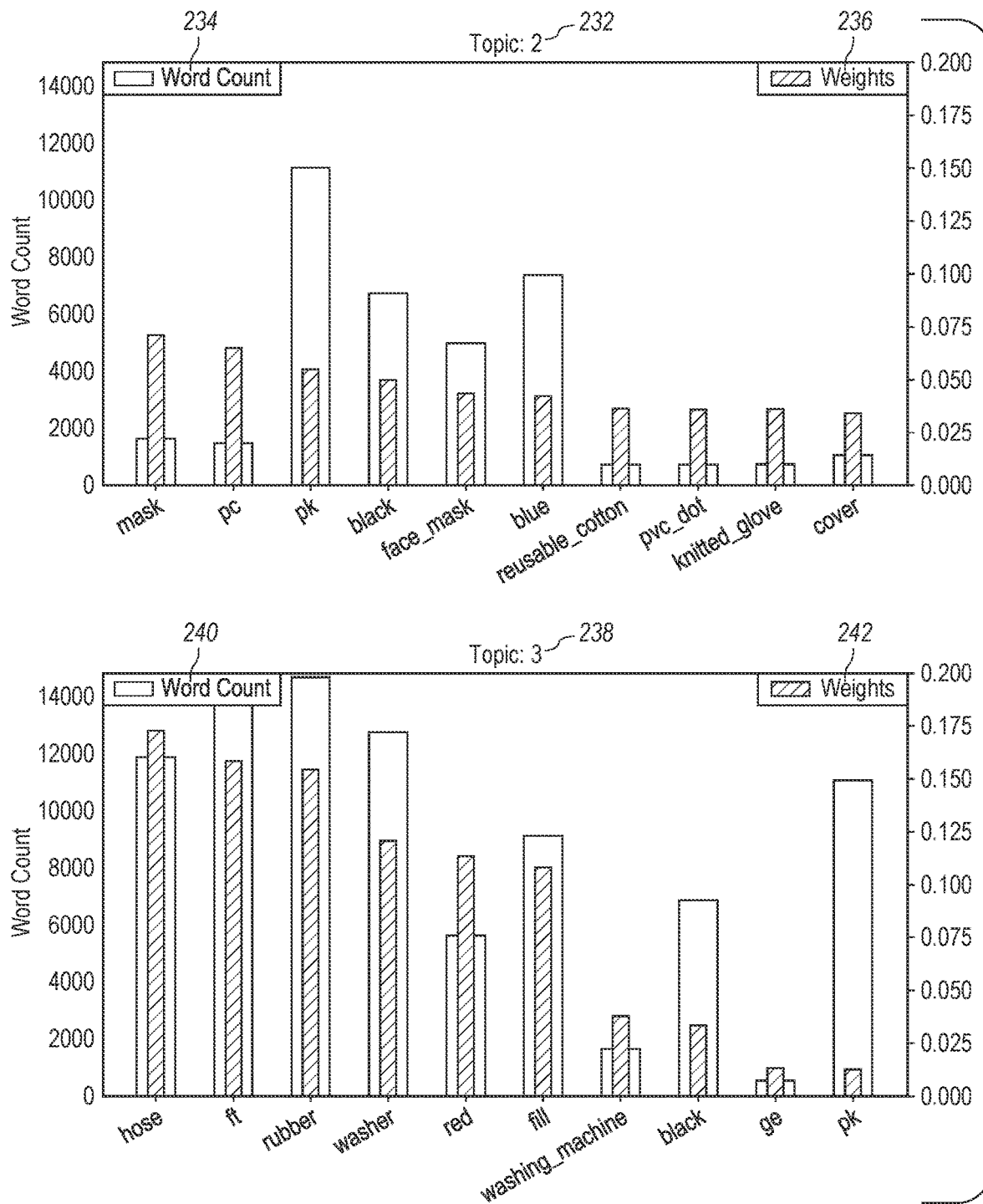

At block 208a, the category feature vector or topic feature vector generates unsupervised clustering of line item descriptions that are grouped under respective topics or categories or latent topics. For example, purchased items, of similar type, belonging to similar supplier-customer information are grouped together in the same associated topic, category, or latent topic/commodity category. At block 208b, the category feature vector or topic feature vector generates a topic or category or latent topic, and each topic or category or latent topic separately contains word distribution of the line item description. At block 208c, each category feature vector or topic feature vector may be a probabilistic distribution of topics. For example. FIG. 2B illustrates top word clouds 210 of 4 topics 212, 214, 216, 218, created for RAC instance, where some words e.g., "topic 0" 212 may cover commodities related to battery and "topic 2" 216 related to "facemasks". FIG. 2C illustrates weights 224, 230, 236, 242 and counts 222, 228, 234, 240 of top words in the different topics, categories, and latent topics namely "topic 0" depicted as 220, "topic 1" depicted as 226, "topic 2" depicted as 232 and "topic 3" depicted as 238. In an embodiment, the latent topics, categories, and topics are generated dynamically in real-time and/or periodically, based on the incoming invoice data.

In an embodiment, the pre-approved invoices or the invoices approved in the past which are used to pre-train the data repository are stored as the one or more predefined historical invoice data according to their mapping with their corresponding supplier-customer information. As an example, the one or more predefined historical invoice data is stored as CSV flat files. Additionally, description lines, line strings, words, texts, phrases, contexts, and patterns contained in each of the one or more predefined historical invoice data are also stored as the one or more predefined contexts and patterns, and the one or more predefined invoice descriptions. The topics, categories, and latent topics generated during the pre-training process of models are stored in the data repository 134.

Referring back to FIG. 1, the recommendation system 112 comprises the memory 136 programmed or configured to store including, but not limiting to, the predetermined constraints specified in the illustration of FIG. 2A, matching status of each of the one or more invoice characters along with their similarity scores, one or more identified categories of the incoming invoice along with their computed categorical similarity scores, recommendations of the account codes presented on GUI for previous computer generated invoice data, most recently used account codes, favorites of account codes, prior account codes that are used, a frequency of account codes being used, flagged account codes, highlighted account codes, prioritized account codes, labeled account codes, pointer account codes, tagged account codes, or a combination thereof, order associated to ranking of account code recommendations and other information relating to the processing of incoming invoices as well as information relating to the invoice data processed in the past.

2.2 Example Augmentation of Metadata

FIG. 2D illustrates an example process of augmenting metadata for account code entry to the one or more items of invoice data. FIG. 2D and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

Referring to FIG. 2D, in an embodiment, an example process of augmenting metadata for account code entry to the one or more items of invoice data is programmed at block 226 to prepare and issue invoices by the supplier associated with the supplier systems 108a-108n. In one example, the supplier may be associated with third-party system 106a-106n to prepare and issue invoices. In an embodiment, authorized and authenticated suppliers may prepare and issue the invoices for receiving payments from the customer.

In response to the issuance of invoices at block 226 from the supplier, in block 228, the process is configured to run predefined verification and validation processes via any of the user computers 102a-102n, ERP systems 104a-104n, and the recommendation system 112. The process verifies in the associated systems 102, 104, and 112 whether the configured or validated supplier has issued the invoices.

In response to verification and validation at block 228, in block 230, the recommendation system 112 performs transformation and metadata augmentation for mapping the invoice data with correct and accurate account codes which are determined based on the supplier-customer information and invoice lines strings.

In an embodiment, at block 232, the supplier-customer information in the incoming invoices filters the entries in the data repository 134 and narrows down the search to extract the predefined historical invoice data of the same supplier-customer information. The invoice line strings including description lines associated with contexts and patterns in the incoming invoices are compared with the predefined historical invoice data filtered out in the database. Based on the comparison, when the invoice line strings including description lines match with any of the predefined historical invoice data on a similarity or relevancy basis, the account code or billing code associated with the most relevant predefined historical invoice data is extracted and recommended. Based on the recommendations, corrections are requested to correct or map the accurate code to the invoices, at block 232. The recommendations are provided to display on a GUI of any of the user computers 102a-102n and the recommendation system 112 associated with the AP user or customer. In an embodiment, additional filters of constraints relating to updated data on the invoice, user profile, etc., may be applied at the time of recommending the account codes.

After mapping the accurate account code or predicted account code, at block 234, the AP user or customer carries out a financial review process to check all the details of the invoices displayed on the GUI. For example, the customers of the user computers 102 may check for shipping address information, delivery address, zip codes, supplier identifier, business codes, invoice number identifier, the unit cost of items, the total number of products, billable hours of services procured, etc. This process at block 234 may also involve user computers 102 input one or more corrections, or change of recommended account codes, change the settings of any of the favorites of account codes, the most recently used account codes, the prior account codes that are used, the frequency of account codes being used, the flagged account codes, the highlighted account codes, the prioritized account codes, the labeled account codes, the pointer account codes, the tagged account codes, or a combination thereof.

At block 236, after a thorough review, the user computers 102a-102n, ERP systems 104a-104n, and recommendation system 112, approve making payments to the supplier towards the invoices. In an embodiment, ERP systems 104-104n may also approve the invoices for making payments as depicted in FIG. 2D.

3.0 EXAMPLE ACCOUNT CODE RECOMMENDATION SYSTEM

Figure 3:
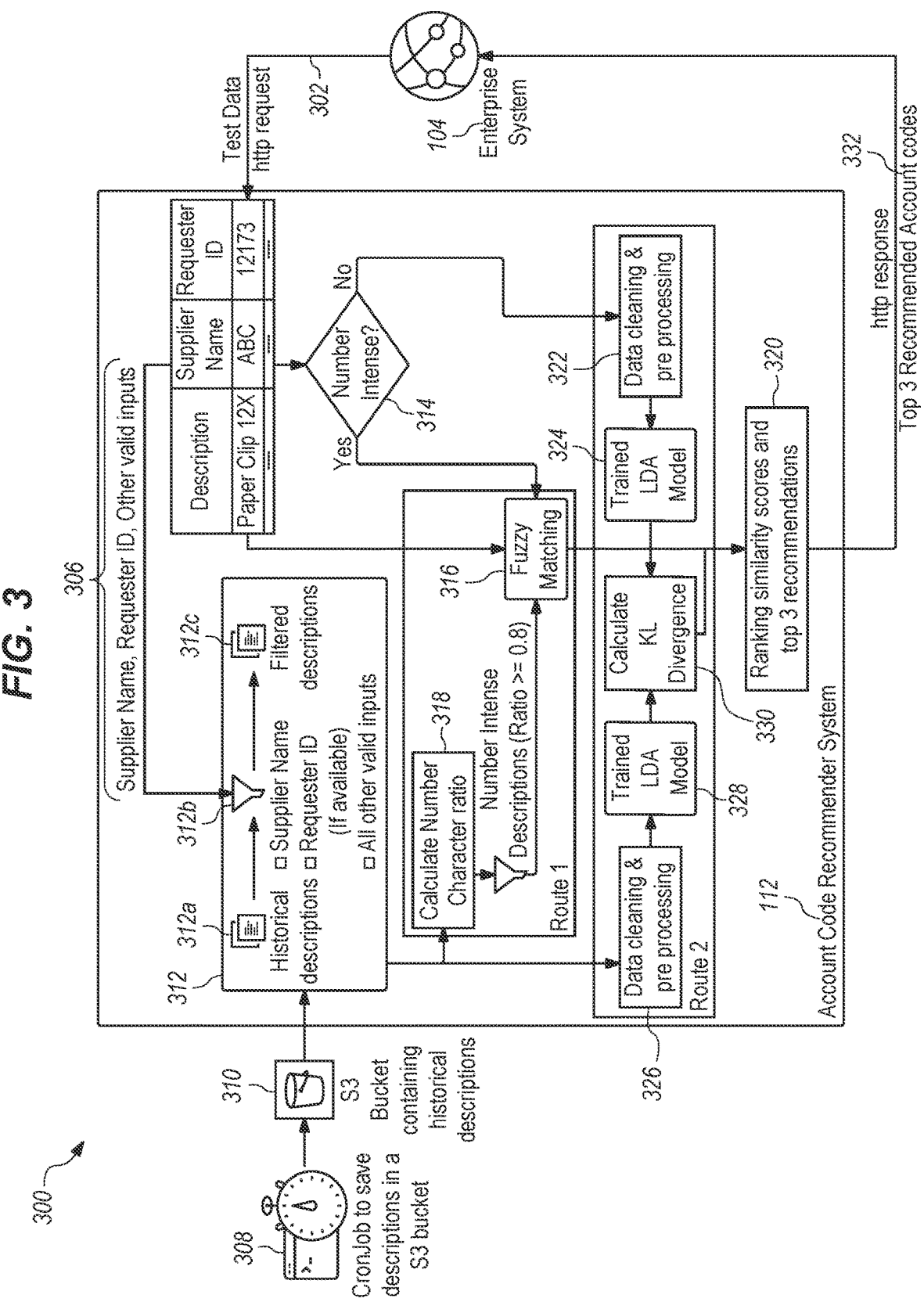
FIG. 3 illustrates an example account code recommendation system, according to an embodiment.

FIG. 3 illustrates an example process 300 for recommending account codes by recommendation system 112, according to an embodiment. In an embodiment, at block 302, the ERP system 104a-104n initiates, for example, a "http request" containing an invoice data. In an embodiment, the ERP system 104a-104n is associated to customer, or AP user or requester who is involved in reviewing, editing invoice data, and approving the invoice data with appropriate account code or billing code. The invoice data represents type or pattern, such as, enterprise invoices, purchase orders, expense reports, billing entries, requisitions, electronic invoices, pro forma invoices, bill of sale, debit notes, credit notes, remittance slips, manual entries of bills, paper slips, and other digital electronic documents associated with procurement of goods or services.

In response to "http request" initiated by ERP system 104a-104n, at block 302, the recommendation system 112 receives the initiated invoice data 304. The invoice data 304 received may be considered as an incoming invoice 304, as an example. The invoice data 304 includes invoice line strings including the one or more descriptions in combination with the one or more characters. For example, descriptions may include words, texts, phrases, characters, and description lines defining item description, name of items, price details, commodity item information, and other information related to the item or service being purchased. The characters in the invoice data 304 may include numeric characters, numbers, or pure numbers in the invoice line strings. For example, the invoice data 304 contains a description as "paper clip 12 X" associated with supplier name "ABC" and requester identifier as "12173". The invoice data 304 comprises supplier identification, requester identification, and other valid inputs as depicted by 304. The supplier identifier and requester identifier indicates supplier-customer relationship or supplier-customer transaction. The other valid inputs may be shipping address information, delivery address, zip codes, supplier identifier, business codes, invoice number identifier, unit cost of items, total number of products, billable hours of services procured etc. Additionally, the invoice data 304 having descriptions and characters defining contexts and patterns associated to the invoice data 304.

Based on supplier name or identifier, requester identifier or other valid inputs 304, the recommendation system 112 searches in the data repository 134 for all the records created with respect to the same supplier and customer matching the supplier identifier and requester identifier 304. In an embodiment, data repository 134 saves or stores each historical invoice data periodically 308 in the form of map table, lookup table or bucket 308. Thus, when the incoming invoice data 304 is received, fields of the supplied identifier and requester identifier 304 narrows down the number of records from lookup table 310 into limited records 312 which achieves better extraction accuracy. The predefined historical invoice data including historical descriptions and characters 312a are searched based on the records belonging to the supplier identifier, requester identifier and other valid inputs 312b matching with 306 and 304 in the incoming invoice data. The historical descriptions and characters that are most relevant to the description and characters of the incoming invoice data are filtered out from the records depicted as 312c.

At block 314, the recommendation system analyzes each description and character in the incoming invoice data 304 to determine whether the number of characters is more than or equal to a threshold number of characters. For example, the threshold number of characters may be a numerical value or percentage value, or ratio value. In an embodiment, the invoice line strings of the incoming invoice data 304 contain only numbers or pure numbers or contain numeric characters equal to or more than 80% of numeric characters, then process 300 proceeds to block 316.

If the test at block 314 is Yes or true or equivalent, the process 300 continues to carry out fuzzy matching 316 with respect to predefined historical invoice data containing predefined historical characters whose ratio or percentage 318 is similar to the intensity of characters in the incoming invoice data 304. In an embodiment, the process 300 continues to carry out fuzzy matching 316 when the pattern or type of predefined historical invoice data matches or is similar to the pattern or type of the incoming invoice data 304.

The fuzzy matching at block 316 uses the FuzzyWuzzy Python package to match invoice line string characters in the incoming invoice data 304 with the predefined historical invoice data containing a similar pattern of characters 318. Upon matching, similarity scores are computed which results in generating a vector of matching scores. In an embodiment, a similarity feature vector of the incoming invoice data 304 is generated which is matched with eligible feature vectors of the predefined historical invoice data containing characters of patterns similar to that of patterns in the incoming invoice data, where both incoming invoice data having character pattern and predefined historical invoice data containing character patterns belong to same supplier and customer.

Figure 6:
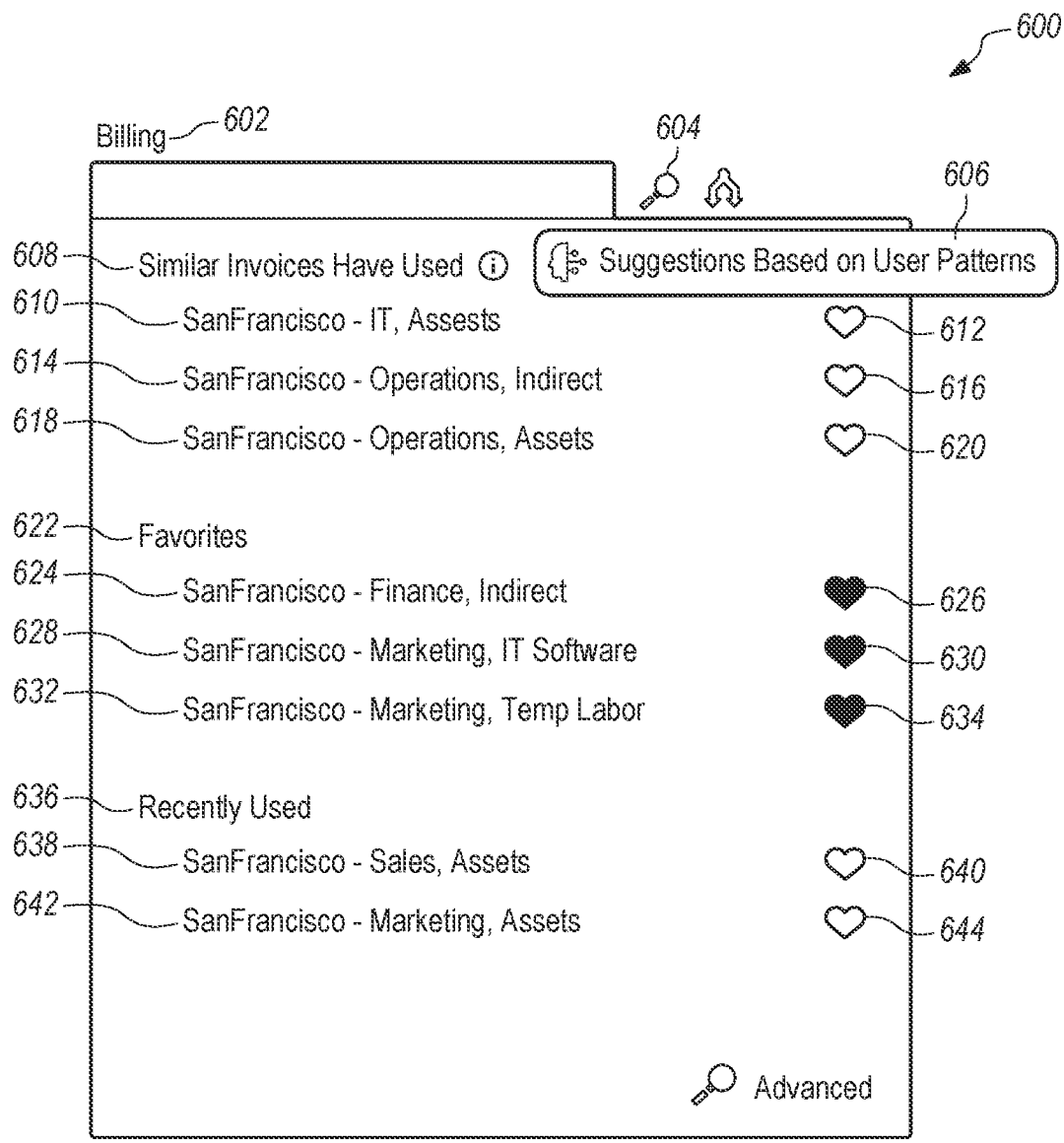
FIG. 6 depicts an example graphical user interface providing recommendations of account codes, according to an embodiment.
Figure 7:
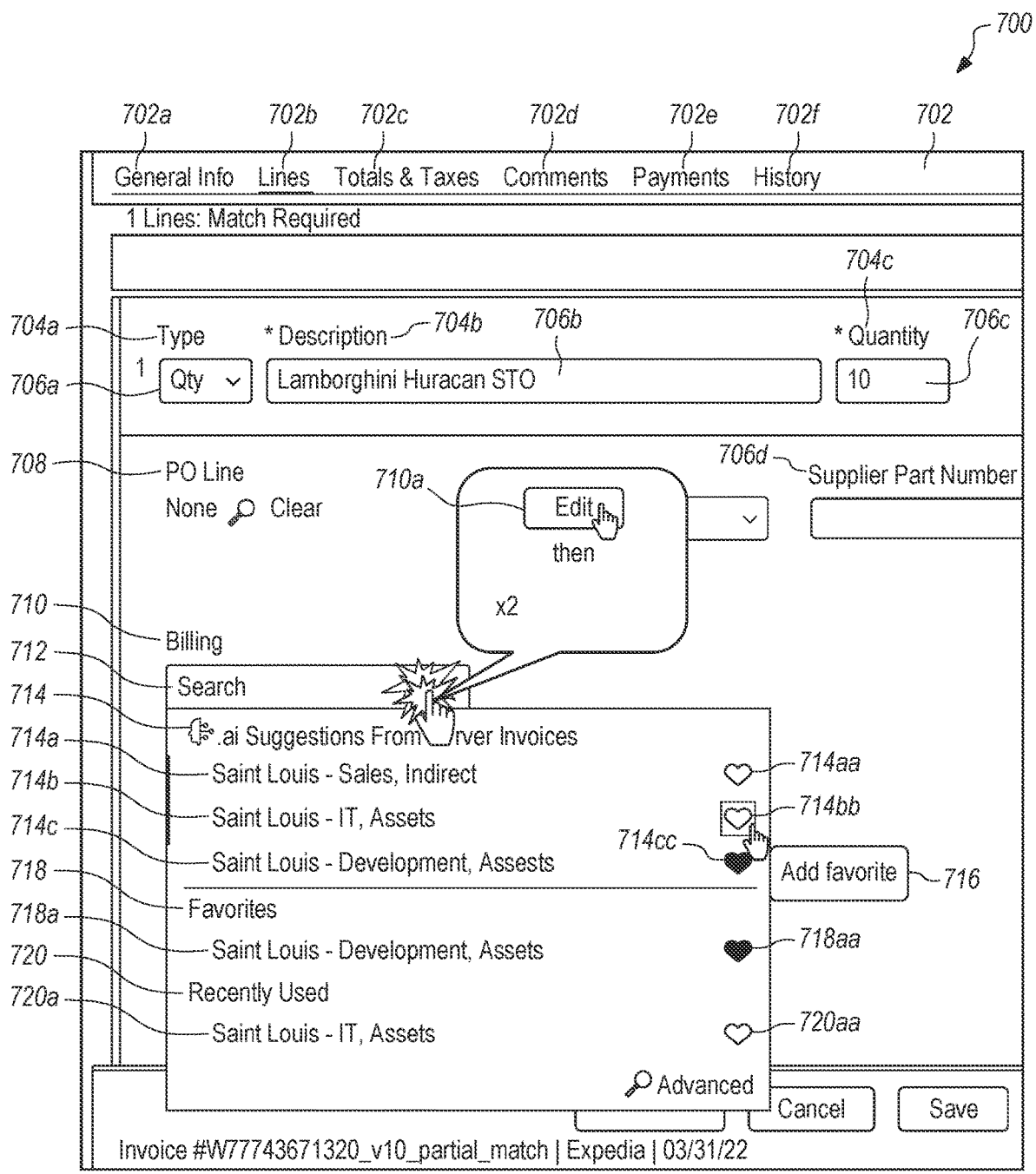
FIG. 7 depicts an example graphical user interface depicting editing of recommended account codes, according to an embodiment.

At block 320, upon computing similarity scores and generating vector of matching scores, one or more account codes corresponding to the matched historical invoice data are detected for the incoming invoice data 304. In an embodiment, the recommendation system 112 uses ML techniques to automatically detect account codes or billing codes and recommend them by displaying them on the GUI for approval. As an example, three recommendations of account codes 332 are displayed on a GUI as shown in FIG. 6 which is described in the later section herein. Further, the recommendations are ranked according to the one or more parameters and displayed on the GUI as shown in FIG. 7 which is described in a later section herein.

If the test at block 314 is No or false or equivalent, the process 300 continues to block 322 to carry out the filtering process as illustrated in FIG. 2A involves data cleaning and preprocessing. In an embodiment, the one or more invoice data 304 may contain both descriptions and characters. The one or more invoice data 304 proceeds through a filtering process that involves cleaning up each line item description based on the predetermined constraints. The filtering process involves cleaning up words, phrases, texts, sentence characters, and other related items in the descriptions. The predetermined constraints for data cleaning may include various steps such as lower-case modification, removal of punctuation, stop words, and numeric characters, lemmatization, tokenization, generation of bi-grams and tri-grams, and filtering out words or phrases that are too short, for example, less than two characters, filtering out words that are too long.

In an embodiment, bi-grams and tri-grams are generated using, for example, Gensim Phraser class. In an embodiment, thresholds involved with filtering out words that are too short or too long are determined as $5^{th}$ Quantile and the $95^{th}$ Quantile of the distribution of length of words in the training data. In an example, data cleaning steps involve removing all numeric characters or numbers for building dictionary for BOW models. The filtering process generates dictionary and training corpus for feature vectors extractions. The filtering process extracts filtered descriptions lines including contexts and patterns associated with the filtered description lines. The filtered line item description is an input to block 324, where the pre-trained LDA model is used for matching the incoming invoice data with predefined historical invoice data by using Kullback-Liebler (KL) divergence and computing invoice specific feature matrix.

At block, 324, one or more categories or topics or latent topics associated with each of the filtered description lines in the invoice line strings of the incoming invoice data 304 are identified. Particularly, each text of the one or more filtered description lines is classified into the one or more categories based on the contexts and patterns associated with each text of the one or more descriptions using pre-trained LDA model. Such categories associated with description lines of the invoice data categorize the incoming invoice data that may be used in scenarios other than augmenting invoices with account codes. The pre-trained LDA model is a hybrid model that uses the stored or logged predefined historical invoice data 312 which are generated and stored in the data repository 134 as per the filtering process described in FIG. 2A, FIG. 2B, and FIG. 2C. The predefined historical invoice data, having supplier and requester/customer information matched with supplier-customer information of the incoming invoice data, is extracted which is depicted as 312c. In an embodiment, the predefined historical invoice data comprises predefined invoice descriptions. The predefined historical invoice data with the predefined invoice descriptions matching the filtered description lines of the incoming invoice data are extracted 312c. More particularly, the predefined invoice descriptions including predefined historical categories comprise category feature vectors or topic feature vectors. The predefined invoice descriptions with the predefined historical categories matching the identified categories of the incoming invoice data are extracted 312c. The extracted predefined historical invoice data proceeds through blocks 326 and 328 for the data cleaning process and pre-training of the LDA model as described in FIG. 2A, FIG. 2B, FIG. 2C.

At block 330, each of the identified one or more categories, including corresponding contexts and patterns are matched with the predefined historical categories associated with predefined invoice description of the predefined historical invoice data. In an embodiment, each of the contexts and the patterns associated with each of the filtered description lines of the filtered invoice data is matched with predefined contexts and patterns of the predefined historical invoice data. The matching process for matching the categories generates new feature vector for the incoming invoice data 304. Next, KL divergence between the category feature vector or topic feature vector of predefined historical invoice data and new feature vector is computed. In an embodiment, KL divergence computes categorical similarity score for each of the one or more categories.

At block 320, in response to KL divergence computation of categorical similarity score, the one or more account codes are detected and displayed on the GUI of the user computers 102 for review and approval for mapping to the incoming invoice data 304. In an embodiment, additional filters of constraints relating to updated data on the invoice, user profile, etc., may be applied at the time of recommending the account codes. Additionally, the one or more account codes are automatically added to the incoming invoice data with no requirement of GUI input from the user(s). As an example, three recommendations of account codes 332 are displayed on the GUI as shown in FIG. 6 along with ranking as shown in FIG. 7 which are described in later sections herein. Additionally, process 300 consolidates patterns from across all spend including, including invoices and purchase orders, and then delivers as recommendations by translating and/or mapping according to the user(s) or customer specification and their associated general ledger account structure and displays them on the GUI for the corresponding incoming invoice data. Also, categorization of invoice data enables the process 300 to be used in scenarios other than augmenting invoice data with accounts. In one embodiment, process 300 can function for categorizing the invoice data to support process optimization; for example, a user could elect to automatically pay certain invoices, while other invoices require a workflow or approval chain to review similar transactions for sourcing or pre-approving such invoice data.

4.0 OVERVIEW OF RECOMMENDING ACCOUNT CODES

Figure 4:
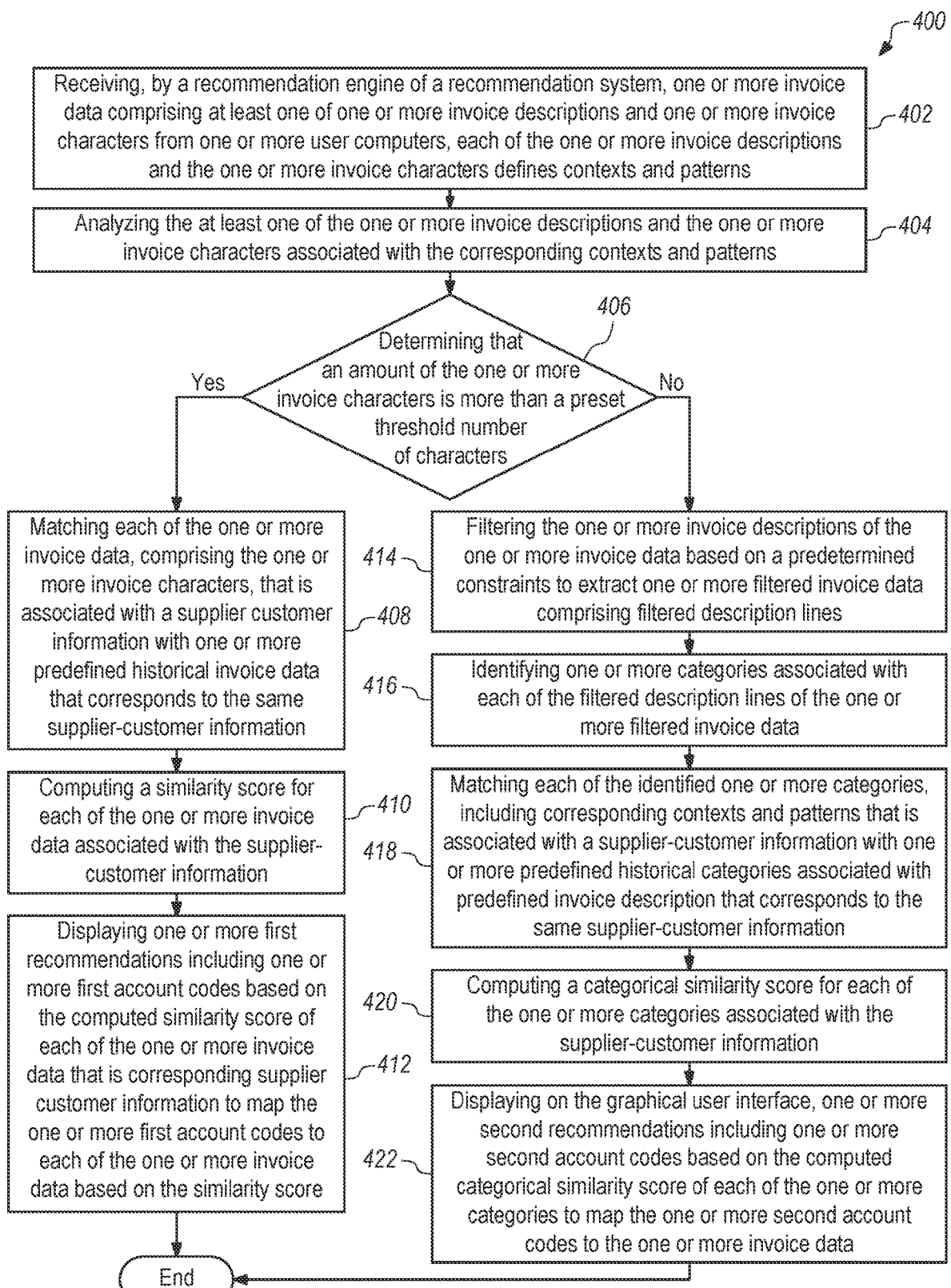
FIG. 4 depicts an example flowchart for detecting account codes based on invoice characters and invoice descriptions and displaying recommendations and ranking on a graphical user interface (GUI), according to an embodiment.

FIG. 4 depicts an example flowchart for detecting account codes based on invoice characters and invoice descriptions and displaying recommendations and ranking on the GUI, according to an embodiment. The flowchart 400 begins at step 402, the procurement application 114 of the recommendation system 112 receives one or more invoice data from any of the user computers 102a-102n, the ERP system 104a-104n, third-party systems 106a-106n, and the supplier systems 108a-108n. In an embodiment, the one or more items of invoice data may be the incoming invoice as it may be received by the recommendation system 112 that maps the billing code or account code to the incoming invoice. For example, the one or more invoice data being the incoming invoice may be a non-PO invoice containing non-PO invoice lines. Each of the one or more invoice data contains invoice line strings.

In an embodiment, the invoice line strings may contain non-PO invoice line strings. The non-PO invoice line strings comprise one or more invoice descriptions and the one or more invoice characters. The one or more descriptions are different from the one or more characters which may include numbers/numeric characters in the invoice line strings. Each of the one or more invoice descriptions and the one or more characters defines the contexts and patterns of the incoming invoice. Each incoming invoice specifies which supplier and customer the incoming invoice may be related to and also may specify the link and relationship detail of the associated supplier and customer. For example, the one or more invoice data may include supplier identifier, request identifier, supplier name, requester name, address, shipping to address, zip code, the unit cost of items, total number of products, billable hours of services procured, etc.

In response to receiving the one or more invoice data at step 402, analyzing instructions 118, at step 404, analyzes the at least one of the one or more invoice descriptions and the one or more invoice characters associated with the corresponding contexts and patterns. In an embodiment, the incoming invoice having invoice line strings with words, texts, characters and lines defining item description, name of items, price details, commodity item information, service details being procured and other information related to the item or service being purchased are analyzed. Analyzing these invoice line strings provide semantics of all individual words and phrases as well as semantics meaning of the entire sentence.

At step 406, the decision-making instructions 120 determine whether an amount of the one or more invoice characters is more than the preset threshold number of characters based on the analysis. Specifically, at step 406, the decision-making instructions 120 determine whether the number of characters is more than or equal to a threshold number of characters. For example, the threshold number of characters may be a numerical value or percentage value, or ratio value. In an embodiment, the invoice line strings of the incoming invoice data contain only numbers or pure numbers or contain numeric characters equal to or more than 80% of numeric characters, then process 400 proceeds to block 408 on satisfying the condition at step 406 as Yes.

If the condition at step 406 is Yes or true or equivalent, process 400 proceeds to step 408 where matching instructions 120 perform matching each of the one or more invoice characters included in the incoming invoice with the one or more predefined historical invoice data. In an embodiment, both incoming invoices and the one or more predefined historical invoice data correspond to the same supplier-customer information. More particularly, the records associated to the supplier and customer are filtered in the data repository 134 by using the supplier-customer information specified in the incoming invoice. Then, the characters of the incoming invoice are matched with only those records having characters defined in a way similar or equivalent to the invoice line strings in the incoming invoice data. Further, each of the contexts and the patterns associated with the incoming invoice is matched with the predefined contexts and patterns of the predefined historical invoice data. In an embodiment, the matching instructions at step 408 carries out fuzzy matching with predefined historical invoice data containing predefined characters whose ratio or percentage is similar or equivalent to ratio or percentage of characters in the incoming invoice.

At step 410, in response to matching, similarity scores for each of the one or more invoice data are computed. In an embodiment, similarity scores are computed by the computation instructions 128 which results in generating a vector of matching scores. In an embodiment, a similarity feature vector of the incoming invoice is generated. The similarity feature vector may be matched with eligible feature vectors of the predefined historical invoice data.

At block 412, the display instructions 132 displays the one or more recommendations including the one or more account codes or billing codes based upon the similarity scores and vector of matching scores. In an embodiment, the one or more account codes corresponding to the matched historical invoice data are detected for the incoming invoice. In an embodiment, additional filters of constraints relating to updated data on the invoice, user profile, etc., may be applied at the time of recommending the account codes. As an example, three recommendations of account codes are displayed on the GUI as shown in FIG. 6. Additionally, the one or more account codes are automatically added to the incoming invoice data with no requirement of GUI input from the user(s). Further, the recommendations are ranked according to the one or more parameters and displayed on the GUI as shown in FIG. 7.

Referring back to step 406, if the condition at step 406 is No or false or equivalent when the decision-making instructions 120 determines that the amount of the one or more invoice characters is not more than the preset threshold number of characters, then the process 400 proceeds to step 414.

At step 414, filtering instructions 122 filter the one or more invoice descriptions of the one or more invoice data based on the predetermined constraints to extract one or more filtered invoice data comprising filtered description lines. The filtering instructions 122 performs the process 200 as covered in FIG. 2A for data cleaning and preprocessing. In an embodiment, the incoming invoice may contain both descriptions and characters that are refined in their format by the filtering instructions 122. For example, data cleaning steps involve removing all numeric characters or numbers for building a dictionary for BOW models. The filtering process results in extracting filtered description lines including contexts and patterns associated with the filtered description lines.

At step 416, the category identification instructions 124 identify the one or more categories associated with each of the filtered description lines of the one or more filtered invoice data. More particularly, one or more categories or topics or latent topics associated with each of the filtered description lines in the invoice line strings of the incoming invoice data 304 are identified. Each text of the one or more filtered description lines is classified into the one or more categories based on the contexts and patterns associated with each text of the one or more descriptions using pre-trained LDA model. The categories can be used in scenarios other than augmenting invoices with account codes, such as differentiated automatic or manual approval of invoices, as previously described.

At step 418, the matching instructions 126 match each of the identified one or more categories, including corresponding contexts and patterns with the predefined historical categories associated with predefined invoice description of the predefined historical invoice data. Both the incoming invoice data and the predefined historical invoice data correspond to the same supplier-customer information. In an embodiment, each of the contexts and the patterns associated with each of the filtered description lines of the filtered invoice data is matched with one or more predefined contexts and patterns of the one or more predefined historical invoice data. The matching process for matching the categories generates a new feature vector for the incoming invoice.

At step 420, the computation instructions 128 compute the categorical similarity score for each of the one or more categories by computing KL divergence between the new feature vector and the category feature vector or topic feature vector of predefined historical invoice data.

At step 424, In response to KL divergence computation of categorical similarity, the one or more account codes are detected and displayed on the GUI associated to the user computers 102 for review and approval for the incoming invoice data 304. In an embodiment, additional filters of constraints relating to updated data on the invoice, user profile, etc., may be applied at the time of recommending the account codes. Additionally, the one or more account codes are automatically added to the incoming invoice data 304 with no requirement of GUI input from the user(s). As an example, three recommendations of account code 332 are displayed on the GUI as shown in FIG. 6 and FIG. 7.

In an embodiment, new invoice data may be received associated with new supplier-customer information corresponding to a new supplier-customer transaction. For the new invoice data as well, process 400 is carried out. During the matching operation, the matching instructions 126 perform either fuzzy matching or KL divergence depending upon the ratio of characters in the new invoice data. The invoices with invoice line strings, descriptions, characters, contexts, and patterns relevant to the invoice line strings of the new invoice data, are filtered either by fuzzy matching operation or KL divergence computation. Then, the account codes associated with any of the predefined historical invoice data are detected when the pattern of corresponding historical invoice data is most relevant to the pattern of the new invoice data. The detected account codes are recommended on the GUI for user computers 102 review and approval. The account codes may be ranked as per the one or more parameters. Additionally, process 400 consolidates patterns from across all spend including, including invoices and purchase orders, and then delivers as recommendations by translating and/or mapping according to the user(s) or customer specification and their associated general ledger account structure and displays them on the GUI for the corresponding incoming invoice data.

5.0 EXAMPLE FLOWCHART OF RECOMMENDING ACCOUNT CODES

Figure 5:
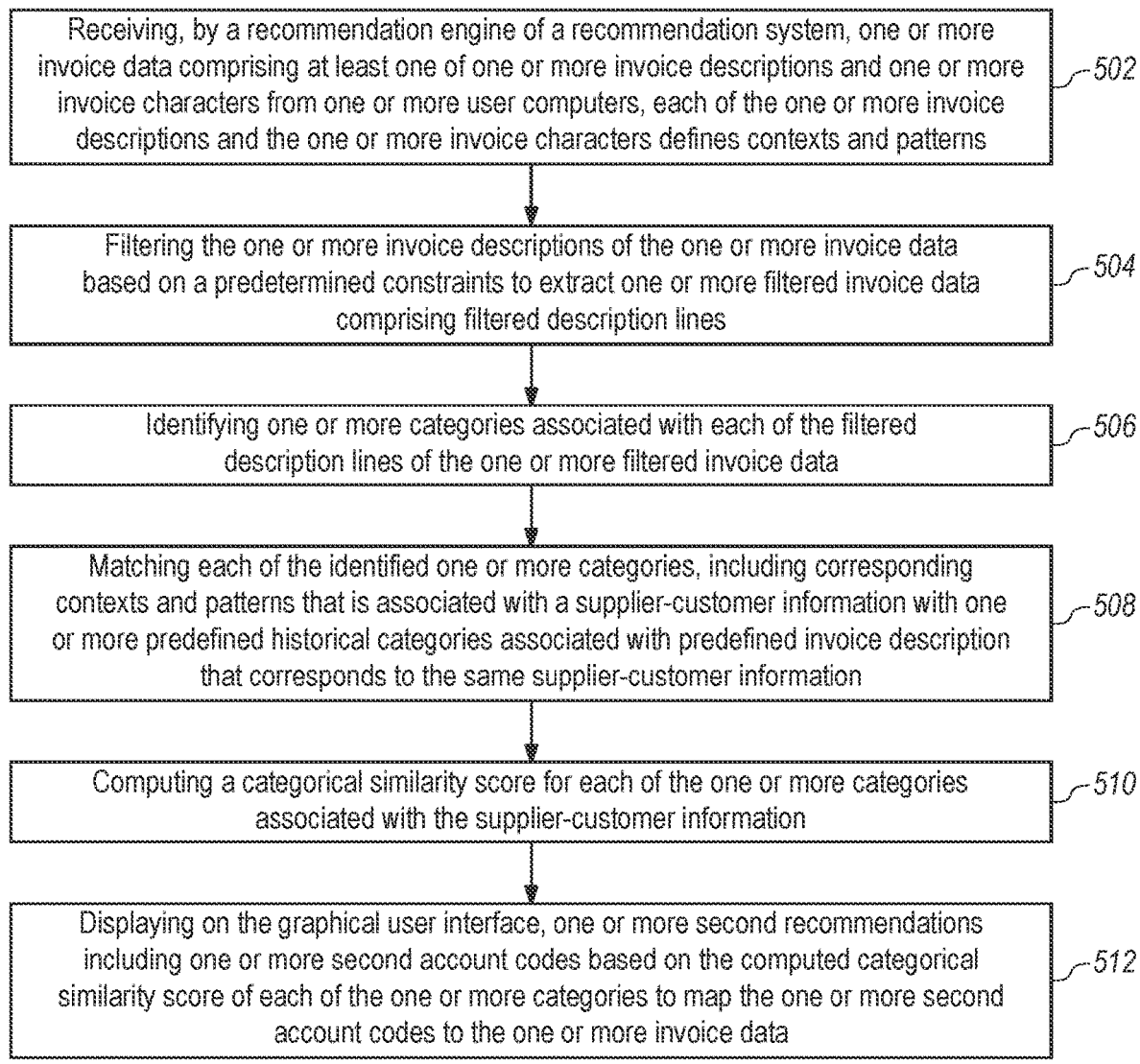
FIG. 5 depicts an example flowchart for detecting account codes based on invoice descriptions of invoice data and providing recommendations on a graphical user interface that may be facilitated by the recommendation system, according to an embodiment.

FIG. 5 depicts an example flowchart 500 for detecting account codes based on invoice descriptions of invoice data and providing recommendations on a graphical user interface that may be facilitated by the recommendation system 112, according to an embodiment. Process 500 begins at step 502, the procurement application 114 of the recommendation system 112 receives one or more invoice data from any of the user computers 102a-102n, the ERP system 104a-104n, third party systems 106a-106n, and the supplier systems 108a-108n. In an embodiment, the one or more invoice data may be the incoming invoice as it may be received by the recommendation system 112. In an example, the one or more invoice data being the incoming invoice may be a non-PO invoice containing non-PO invoice lines. Each of the one or more invoice data contains invoice line strings that may be non-PO invoice line strings. The non-PO line strings may comprise one or more invoice descriptions and the one or more invoice characters. The one or more descriptions are different from the one or more characters. The characters may include numbers/numeric characters in the invoice line strings. Each of the one or more invoice descriptions and the one or more characters defines the contexts and patterns of the incoming invoice. Further, each of the incoming invoices specifies which supplier and customer are in the incoming invoice and also may specify the link and relationship details of the associated supplier and customer. For example, the one or more invoice data may include supplier identifier, request identifier, supplier name, requester name, address, shipping to address, zip code, the unit cost of items, total number of products, billable hours of services procured, etc.

At step 504, in response to receiving the one or more invoice data at step 502, the filtering instructions 122 filter the one or more invoice descriptions of the one or more invoice data based on the predetermined constraints to extract one or more filtered invoice data comprising filtered description lines. The filtering instructions 122 perform the process 200 as covered in FIG. 2A for data cleaning and preprocessing. In an embodiment, the incoming invoice may contain both descriptions and characters. The descriptions and characters in the incoming invoice are refined in their format by the filtering instructions 122. For an example, data cleaning steps involve removing all numeric characters or numbers for building a dictionary for BOW models. The filtering process results in extracting filtered description lines including contexts and patterns associated with the filtered description lines.

At step 506, the category identification instructions 124 identify the one or more categories associated with each of the filtered description lines of the one or more filtered invoice data. More particularly, one or more categories or topics or latent topics associated with each of the filtered description lines in the invoice line strings of the incoming invoice data 304 are identified. Each text of the one or more filtered description lines is classified into the one or more categories based on the contexts and patterns associated with each text of the one or more descriptions using pre-trained LDA model. Classifying lines into categories facilitates use of the techniques herein in scenarios other than augmenting invoices with account codes, such as differentiated invoice approvals.

At step 508, the matching instructions 126 match each of the identified one or more categories with the predefined historical categories associated with predefined invoice description of the predefined historical invoice data. In an embodiment, each of the contexts and the patterns associated with each of the filtered description lines of the filtered invoice data is matched with one or more predefined contexts and patterns of the one or more predefined historical invoice data. The matching process for matching the categories generates new feature vector for the incoming invoice.

At step 510, the computation instructions 128 compute the categorical similarity score for each of the one or more categories by computing KL divergence between the new feature vector and the category feature vector or topic feature vector of predefined historical invoice data.

At step 512, In response to KL divergence computation of categorical similarity, the one or more account codes are detected and displayed on the GUI associated to the user computers 102 for review and approval for mapping to the incoming invoice data 304. As an example, three recommendations of account code 332 are displayed on the GUI as shown in FIG. 6 and FIG. 7. Additionally, process 500 consolidates patterns from across all spend including, including invoices and purchase orders, and then delivers as recommendations by translating and/or mapping according to the user(s) or customer specification and their associated general ledger account structure and displays them on the GUI for the corresponding incoming invoice data. The association of category values enables using the process 500 in applications other than augmenting invoice data with accounts, such as differentiated invoice approvals.

6.0 EXAMPLE GRAPHICAL USER INTERFACE FOR DISPLAYING ACCOUNT CODES

FIG. 6 depicts an example graphical user interface providing recommendations of account codes. In an embodiment, based on the vector matching score that has been discussed in other sections, three (3) recommendations of account codes are generated in a GUI 600. The example GUI 600 includes billing list or account codes list 602, search field 604, and suggestions or recommendations tab 606. In an embodiment, the recommendations are ranked based on the one or more parameters including, but not limiting to, similar invoices that have been used, most recently used account codes, favorites of account codes, prior account codes that are used, a frequency of account codes being used, flagged account codes, highlighted account codes, prioritized account codes, labeled account codes, pointer account codes, tagged account codes, or a combination thereof.

In the example of FIG. 6, the recommendations are ranked on the basis of similar invoices used 608, favorites of account codes 622, and most recently used account codes 636. In an embodiment, each parameter defining the ranking of the recommendations may include three or more recommendations of account codes and each recommended account code may be associated with interface elements including, but not limited to, icons, drop down menus, radio button options, check boxes, drop-down menus, drag and drop selections, and text fields. The interface elements provide the customer or requester to select options to prioritize the recommended account codes. The selection of an interface element enables the recommendation system 112 to log or save the selected preference in the data repository 134 or memory 136 and use it the next time when similar invoice is generated. In this way, the recommendation system 112 automatically detects and recommends or directly maps, in real-time, the prioritized or preferred account code to the new incoming invoice having new incoming invoice data and new incoming invoice line strings.

Furthermore, in an embodiment, under the recommendation "similar invoice have used" 608, there are three recommendations of account codes 610, 614, and 618 fetched based on the supplier-customer information. Each of the account codes 610, 614, and 618 is associated with an interface element to provide preference by selecting favorite options 612, 616, and 620. Similarly, under recommendation "Favorites" 622, there are three recommendations for account codes, the account code 624 is associated with interface element 626, account code 628 is associated with interface element 630, and account code 632 is associated with interface element 634. In an example, under the "Recently used" recommendation, there are two account codes recommended, where account code 638 is associated with interface element 640, and account code 642 is associated with 644. In case, the same billing account is displayed as an ML recommendation and in the favorites or recent section, then the reoccurring or duplicate values may be hidden from the favorites and recent options that may be ranked in the favorite and recent section. In an embodiment, ranking in the favorite and recent section may be lower ranking favorites and recent, which are ranked by recency of use or selection.

In an embodiment, ranking the recommendations of the account codes for the incoming invoice data is based on one or more criteria. The first criteria include generating the feature vector based on the similarity score (in case of characters matching feature vector) or categorical similarity score (in case of categorical/topic feature vector) between the incoming invoice data and the predefined historical invoice data. The second of the one or more criteria involves computing a measure of the relative importance of an account code as compared to other extracted account codes. The combination of the similarity score/categorical similarity score and the measurement of the importance of the account code provides an estimate of the confidence score of the recommended account code.

In an embodiment, description similarity is computed between the description of the incoming invoice and the historical description using the pre-trained LDA model via KL divergence. On the other hand, the importance of a particular account code of a customer is first measured by comparing its usage frequency to all other codes of the same supplier and customer. Specifically, an account code may comprise a usage score of 1 (or 100%) if its usage frequency is the maximum among all account codes. However, the usage score alone is not a comprehensive measure of recommendation confidence of an account code. For example, if all account codes are equally used yielding equal usage frequency, all account code may comprise usage score of 100% which is not a reasonable way of providing 100% recommendation confidence to each account code. In contrast, there is a way for providing an evenly distributed usage score to all account codes. However, evenly distributed usage score indicates high degree of uncertainty when an account code is randomly picked up for any description. This type of behavior does not produce minable pattern in the data for updating the LDA model. Therefore, the usage score of each account code needs to be properly scaled to reflect the uncertainty of entire account code usage frequency distribution.

The uncertainty of usage frequency distribution is measured by an information entropy associated with each the account code. The higher the information entropy, the higher the uncertainty. The usage frequency distribution with the highest uncertainty is a uniformly distribution, which means that all account codes comprise the exact same usage count, and all usage scores are 1. Any deviation from this uniform distribution yields in the reduction of uncertainty, resulting in increase of information gain and confidence. The degree of confidence increases, or information advantage is measured by the ratio between the entropy of a uniform distribution and the entropy of an actual account codes frequency distribution. The ratio (information advantage) is more than 1 if there are different usage frequencies for each account code indicating there is a latent pattern in assigning account code. The account usage score is multiplied by the ratio to incorporate uncertainty into the final confidence score estimation. In an embodiment, the final confidence score is computed as "confidence score=0.7×description similarity+0.3× usage score×information advantage"

In an embodiment, the confidence score is dynamically updated according to customer's behaviors, becoming increasingly confident when the customer performs consistently informative account code assigning behavior, and becoming increasingly unsure if such a behavior is not discovered.

7.0 EXAMPLE GRAPHICAL USER INTERFACE FOR EDITING ACCOUNT CODES

FIG. 7 depicts a graphical user interface providing recommendations of account codes and an interface for editing or making changes to recommended account codes. In an embodiment, GUI 700 includes one or more tabs 702 and under each tab different information detail on account invoicing is viewable. For example, 702 tab field presents different tabs like "General info" 702*a*, "lines" 702*b*, "totals & taxes" 702*c*, "comments" 702*d*, "payments" 702*e* and "history" 702*f*. The user is enabled to click on any of the tabs 702 and view the details. For example, on clicking "Lines" tab, the interface displays one or more sub-tabs "type" 704*a*, "Description" 704*b* and "Quantity" 704*c*. Each of the sub-tabs 704*a*, 704*b*, and 704*c* may comprise a drop-down menu for selecting options. Like "Qty" 706*a* under "Type" 704*a*, the description specified "Lamborghini Huracan STO" 706*b* under "Description" 704*b* and "10" 706*c* as "Quantity" 704*c*.

In an embodiment, the recommendation system 112 displays recommendations of account codes 714*a*, 714*b*, and 714*c* based on parameter like suggestions from similar invoices 714. System 112 displays account codes 718*a* and 720*a* based on parameters like favorites 718 and recently used 720 respectively. Each of recommended account codes is associated with interface elements 714*aa*, 714*bb*, 714*cc*, 718*aa*, and 720*aa*. The interface 700 also provides a separate interface element 716 to add any of the account codes as favorites. The user can edit the recommended account code by selecting edit option 710*a* in the search field 712. For example, the customer can edit the non-PO invoice line by clicking on 710*a*.

In an embodiment, in a billing section 710 through search field 712, the user is able to select preset favorites, and recently used billing accounts that are different from the recommended billing accounts. In case, the same billing account is displayed as an ML recommendation, and also as a favorite and/or recently used account, then the user is able to see other unique options for selection and attribute the selected value for updating the ML model for updating the pre-trained LDA model to reflect the new data value. In an embodiment, if the same billing account is displayed as an ML recommendation and in the favorites or recent section, then the reoccurring or duplicate values may be hidden from the favorites and recent options, and additional lower-ranked account values can be shown from the favorites and recent section. In an embodiment, future incoming invoice data of similar patterns are processed based on the new data value and the updated ML model.

8.0 IMPLEMENTATION EXAMPLE—HARDWARE OVERVIEW

Figure 8:
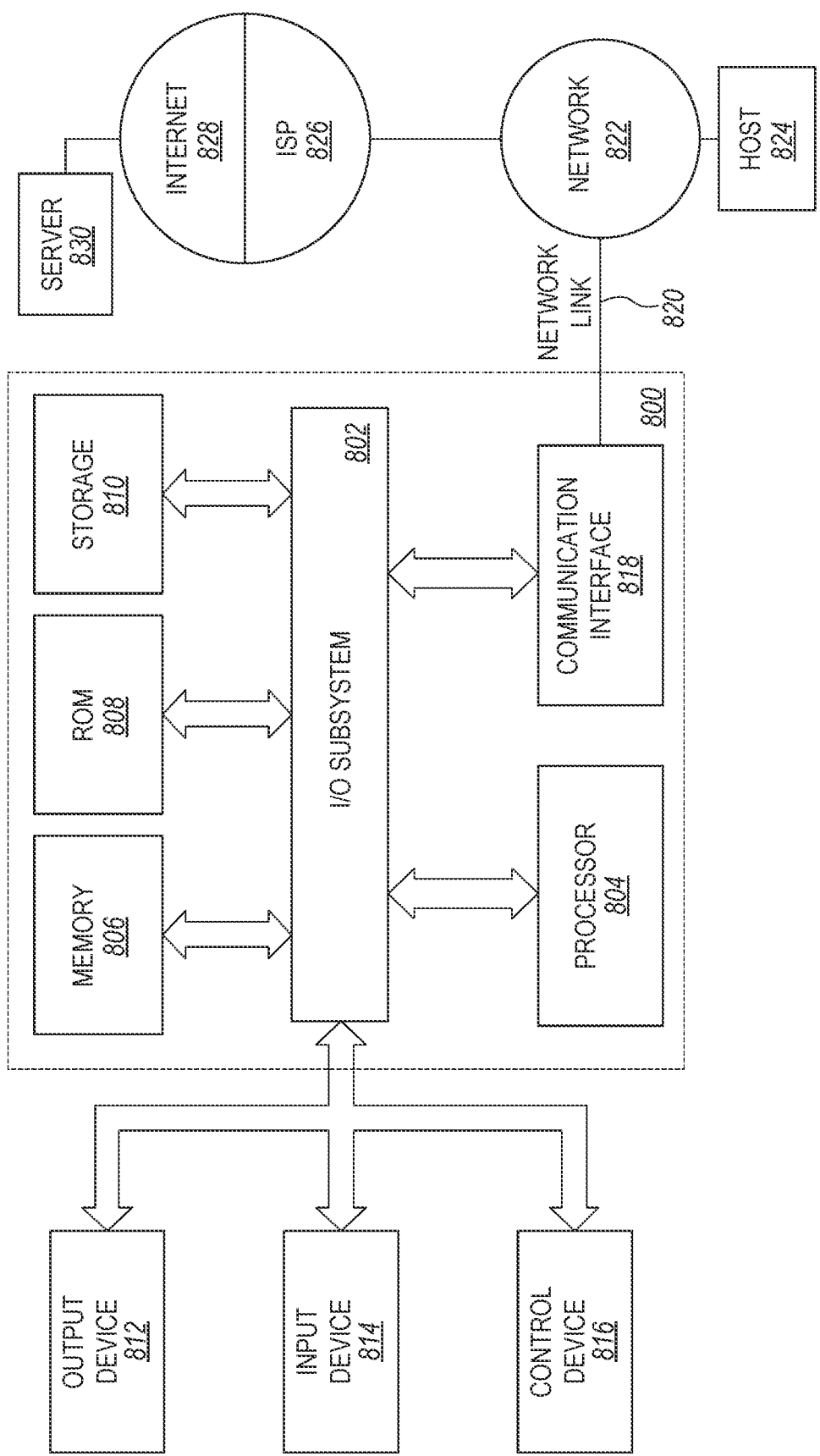
FIG. 8 is a block diagram that illustrates a computer system upon which an embodiment of the invention may be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanisms (s) for communicating information and/or instructions between the components of the computer system 800 over electronic signal paths. The I/O subsystem 802 may include an I/O controller, a memory controller, and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU), or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage devices. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM and may be coupled to I/O subsystem 802 for storing information and instructions. Storage 810 is an example of a non-transitory computer-readable medium that may be used to store instructions and data which when executed by the processor 804 causes performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (INU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other types of control device.

An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For example, a receiver such as a radio frequency antenna or an infrared detector can receive the data carried in a wireless or optical signal and appropriate circuitry can provide the data to I/O subsystem 802 such as placing the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820, and communication interface 818. In the Internet example, a server 830 might transmit a requested code for an application program through Internet 828, ISP 826, local network 822, and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer implemented method of detecting account codes and displaying the detected account codes on a graphical user interface comprising:

receiving, by a recommendation engine of a recommendation system communicatively coupled over a data communication network, one or more invoice data comprising at least one of one or more invoice descriptions and one or more invoice characters from one or more user computers, each of the one or more invoice descriptions and the one or more invoice characters defines contexts and patterns, wherein each of the one or more invoice data comprising a supplier-customer information that corresponds to a supplier-customer transaction;

analyzing, by the recommendation engine, the at least one of the one or more invoice descriptions and the one or more invoice characters associated with the corresponding contexts and patterns;

determining, by the recommendation engine, that an amount of the one or more invoice characters is more than a preset threshold number of characters based on the analysis, for performing:

matching, by the recommendation engine, each of the one or more invoice data, comprising the one or more invoice characters, that is associated with a supplier-customer information with one or more predefined historical invoice data that corresponds to the same supplier-customer information, wherein each of the contexts and the patterns associated with each of the one or more invoice data is matched with one or more predefined contexts and patterns of the one or more predefined historical invoice data that corresponds to the same supplier-customer information;

computing, by the recommendation engine, a similarity score for each of the one or more invoice data associated with the supplier-customer information based on the matching with the one or more predefined historical invoice data that corresponds to the same supplier-customer information; and displaying, by the recommendation engine on the graphical user interface, one or more first recommendations including one or more first account codes based on the computed similarity score of each of the one or more invoice data that is corresponding supplier-customer information to map the one or more first account codes to each of the one or more invoice data based on the similarity score;

determining, by the recommendation engine, that an amount of the one or more invoice characters is not more than the preset threshold number of characters based on the analysis, for performing:

filtering, by the recommendation engine, the one or more invoice descriptions of the one or more invoice data based on predetermined constraints to extract one or more filtered invoice data comprising filtered description lines and to generate a training corpus for a pre-trained Natural Language Processing (NLP) model;

identifying, by the recommendation engine, one or more categories associated with each of the filtered description lines of the one or more filtered invoice data by classifying the filtered description lines with the pre-trained NLP model;

matching, by the recommendation engine, each of the identified one or more categories, including corresponding contexts and patterns that are associated with a supplier-customer information with one or more predefined historical categories associated with predefined invoice description of the one or more predefined historical invoice data that corresponds to the same supplier-customer information, wherein each of the contexts and the patterns associated with each of the filtered description lines of the one or more filtered invoice data is matched with one or more predefined contexts and patterns of the one or more predefined historical invoice data that corresponds to the same supplier-customer information;

computing, by the recommendation engine, a categorical similarity score for each of the one or more categories associated with the supplier-customer information based on the matching with the one or more predefined historical categories associated with the predefined invoice description that corresponds to the same supplier-customer information; and displaying, by the recommendation engine on the graphical user interface, one or more second recommendations including one or more second account codes based on the computed categorical similarity score of each of the one or more categories to map the one or more second account codes to the one or more invoice data.

2. The method of claim 1, wherein the categorical similarity score is computed using Kullback-Liebler (KL) divergence of each of the one or more categories of each of filtered description lines, associated with the corresponding supplier-customer information, with the one or more predefined historical categories with the predefined invoice description that corresponds to the same supplier-customer information.

3. The method of claim 1, further comprising ranking the one or more first recommendations including the one or more first account codes and the one or more second recommendations including the one or more second account codes according to one or more parameters comprising most recently used account codes, favorites of account codes, prior account codes that are used, a frequency of account codes being used, flagged account codes, highlighted account codes, prioritized account codes, labelled account codes, pointer account codes, tagged account codes, or a combination thereof.

4. The method of claim 3, further comprising:
ranking, by the recommendation engine via ranking application, the one or more first recommendations including the one or more first account codes according to the similarity score for each of the one or more invoice data that is associated with the corresponding supplier-customer information; and displaying, by the recommendation engine on the graphical user interface, the ranking of the one or more first recommendations including the one or more first account codes.

5. The method of claim 3, further comprising:
ranking, by the recommendation engine via the ranking application, the one or more second recommendations including the one or more second account codes according to the categorical similarity score for each of the one or more categories of the one or more filtered invoice description lines of the one or more filtered invoice data that is associated with the corresponding supplier-customer information; and displaying, by the recommendation engine on the graphical user interface, the ranking of the one or more second recommendations including the one or more second account codes.

6. The method of claim 1, wherein the identification of the one or more categories associated with each of the filtered description lines of the one or more filtered invoice data comprising classifying each text of the one or more filtered description lines into the one or more categories based on the contexts and patterns associated with each text of the one or more descriptions.

7. The method of claim 1, further comprising:
receiving, by the recommendation engine, a new invoice data comprising invoice descriptions and invoice characters associated with a new supplier-customer information corresponding to a new supplier-customer transaction, wherein each of the invoice descriptions and the one or more invoice characters defines contexts and patterns;

filtering, by the recommendation engine, the invoice descriptions of the new invoice data based on the predetermined constraints to extract a new filtered invoice data comprising description lines;

identifying, by the recommendation engine, categories associated with each of the description lines of the new filtered invoice data;

matching, by the recommendation engine, each of the identified categories, including corresponding contexts and patterns that is associated with the new supplier-customer information with the one or more predefined historical categories associated with predefined invoice descriptions of the one or more predefined historical invoice data that corresponds to one or more predetermined supplier-customer information, wherein each of the contexts and the patterns associated with each of the invoice descriptions of the new invoice data is matched with one or more predefined contexts and patterns of the one or more predefined historical invoice data that corresponds to the one or more predetermined supplier-customer information;

computing, by the recommendation engine, a categorical similarity score for each of the matched categories associated with the new supplier-customer information with the one or more predefined historical categories associated with the predefined invoice description that corresponds to the one or more predetermined supplier-customer information; and displaying, by the recommendation engine on the graphical user interface, recommendations including account codes based on the computed categorical similarity score of each of the categories to map the account codes to the new invoice data.

8. The method of claim 1, wherein the graphical user interface is communicatively connected to the one or more user computers, one or more enterprise resource planning (ERP) computer systems, one or more third-party systems and the recommendation system, each of the one or more user computers, the one or more ERP computer systems, and the one or more third-party systems is communicatively coupled to the data communication network.

9. The method of claim 1, wherein the one or more invoice data comprise data from expense reports, invoice processing, purchase orders, requisitions, accounts payable, or supplier-customer related transactions.

10. The method of claim 1, wherein each of the supplier-customer information, the one or more predefined historical invoice data, the one or more predefined contexts and patterns of the one or more predefined historical invoice data, the preset threshold number of characters, the predetermined constraints and the one or more parameters are stored in a memory of the recommendation system.

11. A computer implemented method of detecting account codes and displaying the detected account codes on a graphical user interface comprising:
   receiving, by a recommendation engine of a recommendation system communicatively coupled over a data communication network, one or more invoice data comprising at least one of one or more invoice descriptions and one or more invoice characters from one or more user computers, each of the one or more invoice descriptions and the one or more invoice characters defines contexts and patterns, wherein each of the one or more invoice data comprising a supplier-customer information that corresponds to a supplier-customer transaction;
   filtering, by the recommendation engine, the one or more invoice descriptions of the one or more invoice data based on predetermined constraints to extract one or more filtered invoice data comprising filtered description lines and to generate a training corpus for a pre-trained Natural Language Processing (NLP) model;
   identifying, by the recommendation engine, one or more categories associated with each of the filtered description lines of the one or more filtered invoice data by classifying the filtered description lines with the pre-trained NLP model;
   matching, by the recommendation engine, each of the identified one or more categories, including corresponding contexts and patterns that is associated with a supplier-customer information with one or more predefined historical categories associated with predefined invoice description of the one or more predefined historical invoice data that corresponds to the same supplier-customer information, wherein each of the contexts and the patterns associated with each of the filtered description lines of the one or more filtered invoice data is matched with one or more predefined contexts and patterns of the one or more predefined historical invoice data that corresponds to the same supplier-customer information;
   computing, by the recommendation engine, a categorical similarity score for each of the one or more categories associated with the supplier-customer information based on the matching with the one or more predefined historical categories associated with the predefined invoice description that corresponds to the same supplier-customer information; and
   displaying, by the recommendation engine on the graphical user interface, one or more second recommendations including one or more second account codes based on the computed categorical similarity score of each of the one or more categories to map the one or more second account codes to the one or more invoice data.

12. The method of claim 11, wherein the categorical similarity score is computed using Kullback-Liebler (KL) divergence of each of the one or more categories of each of filtered description lines, associated with the corresponding supplier-customer information, with the one or more predefined historical categories with the predefined invoice description one or more predefined historical invoice data that corresponds to the same supplier-customer information.

13. The method of claim 11, further comprising ranking the one or more second recommendations including the one or more second account codes according to one or more parameters comprising most recently used account codes, favorites of account codes, prior account codes that are used, a frequency of account codes being used, flagged account codes, highlighted account codes, prioritized account codes, labelled account codes, pointer account codes, tagged account codes, or a combination thereof.

14. The method of claim 13, further comprising:
   ranking, by the recommendation engine via the ranking application, the one or more second recommendations including the one or more second account codes according to the categorical similarity score for each of the one or more categories of the one or more filtered invoice description lines of the one or more filtered invoice data that is associated with the corresponding supplier-customer information; and
   displaying, by the recommendation engine on the graphical user interface, the ranking of the one or more second recommendations including the one or more second account codes.

15. The method of claim 11, wherein the identification of the one or more categories associated with each of the filtered description lines of the one or more filtered invoice data comprising classifying each text of the one or more filtered description lines into the one or more categories based on the contexts and patterns associated with each text of the one or more descriptions.

16. The method of claim 11, wherein the one or more invoice data comprise data from expense reports, invoice processing, purchase orders, requisitions, accounts payable, or supplier-customer related transactions.

17. One or more non-transitory computer-readable storage media storing instructions which when executed cause one or more processors to perform a method of detecting account codes and displaying the detected account codes on a graphical user interface, the method comprising:
   receiving one or more invoice data comprising at least one of one or more invoice descriptions and one or more invoice characters from one or more user computers, each of the one or more invoice descriptions and the one or more invoice characters defines contexts and patterns, wherein each of the one or more invoice data comprising a supplier-customer information that corresponds to a supplier-customer transaction;
   analyzing the at least one of the one or more invoice descriptions and the one or more invoice characters associated with the corresponding contexts and patterns;
   determining that an amount of the one or more invoice characters is more than a preset threshold number of characters based on the analysis, to perform:
      matching, by the recommendation engine, each of the one or more invoice data, comprising the one or more invoice characters, that is associated with a supplier-customer information with one or more predefined historical invoice data that corresponds to the same supplier-customer information, wherein each of the contexts and the patterns associated with each of the one or more invoice data is matched with one or more predefined contexts and patterns of the one or more predefined historical invoice data that corresponds to the same supplier-customer information;

computing, by the recommendation engine, a similarity score for each of the one or more invoice data associated with the supplier-customer information based on the matching with the one or more predefined historical invoice data that corresponds to the same supplier-customer information; and displaying, by the recommendation engine on the graphical user interface, one or more first recommendations including one or more first account codes based on the computed similarity score of each of the one or more invoice data that is corresponding supplier-customer information to map the one or more first account codes to each of the one or more invoice data based on the similarity score;

determining, by the recommendation engine, that an amount of the one or more invoice characters is not more than a preset threshold number of characters based on the analysis, to perform:

filtering, by the recommendation engine, the one or more invoice descriptions of the one or more invoice data based on predetermined constraints to extract one or more filtered invoice data comprising filtered description lines and to generate a training corpus for a pre-trained Natural Language Processing (NLP) model;

identifying, by the recommendation engine, one or more categories associated with each of the filtered description lines of the one or more filtered invoice data by classifying the filtered description lines with the pre-trained NLP model;

matching, by the recommendation engine, each of the identified one or more categories, including corresponding contexts and patterns that is associated with a supplier-customer information with one or more predefined historical categories associated with predefined invoice description of the one or more predefined historical invoice data that corresponds to the same supplier-customer information, wherein each of the contexts and the patterns associated with each of the filtered description lines of the one or more filtered invoice data is matched with one or more predefined contexts and patterns of the one or more predefined historical invoice data that corresponds to the same supplier-customer information;

computing, by the recommendation engine, a categorical similarity score for each of the one or more categories associated with the supplier-customer information based on the matching with the one or more predefined historical categories associated with the predefined invoice description that corresponds to the same supplier-customer information; and displaying, by the recommendation engine on the graphical user interface, one or more second recommendations including one or more second account codes based on the computed categorical similarity score of each of the one or more categories to map the one or more second account codes to the one or more invoice data.

18. One or more non-transitory computer-readable storage media storing instructions which when executed cause one or more processors to perform a method of detecting account codes and displaying the detected account codes on a graphical user interface, the method comprising:

receiving, by a recommendation engine of a recommendation system communicatively coupled over a data communication network, one or more invoice data comprising at least one of one or more invoice descriptions and one or more invoice characters from one or more user computers, each of the one or more invoice descriptions and the one or more invoice characters defines contexts and patterns, wherein each of the one or more invoice data comprising a supplier-customer information that corresponds to a supplier-customer transaction;

filtering, by the recommendation engine, the one or more invoice descriptions of the one or more invoice data based on predetermined constraints to extract one or more filtered invoice data comprising filtered description lines and to generate a training corpus for a pre-trained Natural Language Processing (NLP) model;

identifying, by the recommendation engine, one or more categories associated with each of the filtered description lines of the one or more filtered invoice data by classifying the filtered description lines with the pre-trained NLP model;

matching, by the recommendation engine, each of the identified one or more categories, including corresponding contexts and patterns that is associated with a supplier-customer information with one or more predefined historical categories associated with predefined invoice description that corresponds to the same supplier-customer information, wherein each of the contexts and the patterns associated with each of the filtered description lines of the one or more filtered invoice data is matched with one or more predefined contexts and patterns of the one or more predefined historical invoice data that corresponds to the same supplier-customer information;

computing, by the recommendation engine, a categorical similarity score for each of the one or more categories associated with the supplier-customer information based on the matching with the one or more predefined historical categories associated with the predefined invoice description that corresponds to the same supplier-customer information; and displaying, by the recommendation engine on the graphical user interface, one or more second recommendations including one or more second account codes based on the computed categorical similarity score of each of the one or more categories to map the one or more second account codes to the one or more invoice data.

\* \* \* \* \*